United States Patent
Ruhe, Jr. et al.

(10) Patent No.: US 7,745,542 B2
(45) Date of Patent: Jun. 29, 2010

(54) LUBRICATING OIL ADDITIVE COMPOSITION AND METHOD OF MAKING THE SAME

(75) Inventors: William R. Ruhe, Jr., Benicia, CA (US); Casey D. Stokes, Novato, CA (US); James A. Gray, Novato, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 972 days.

(21) Appl. No.: 11/495,311

(22) Filed: Jul. 27, 2006

(65) Prior Publication Data

US 2007/0027267 A1 Feb. 1, 2007

Related U.S. Application Data

(63) Continuation-in-part of application No. 11/118,550, filed on Apr. 29, 2005.

(51) Int. Cl.
*C08F 8/32* (2006.01)
(52) U.S. Cl. .............. 525/327.6; 525/329.6; 525/379; 525/380; 525/381; 525/382; 525/384
(58) Field of Classification Search ............. 525/327.6, 525/329.6, 379, 380, 381, 382, 384
See application file for complete search history.

(56) References Cited

U.S. PATENT DOCUMENTS

| | | | |
|---|---|---|---|
| 2,551,813 A | 5/1951 | Pinkney | |
| 2,992,708 A | 7/1961 | Lyon | |
| 3,018,291 A | 1/1962 | Anderson et al. | |
| 3,024,237 A | 3/1962 | Drummond et al. | |
| 3,100,673 A | 8/1963 | Ulmer et al. | |
| 3,172,892 A | 3/1965 | Suer et al. | |
| 3,219,666 A | 11/1965 | Norman et al. | |
| 3,272,746 A | 9/1966 | Suer et al | |
| 3,361,673 A | 1/1968 | Stuart et al. | |
| 3,381,022 A | 4/1968 | Suer | |
| 3,560,455 A | 2/1971 | Hazen et al. | |
| 3,819,660 A | 6/1974 | Cahill et al. | |
| 3,912,764 A | 10/1975 | Palmer | |
| 4,152,499 A | 5/1979 | Boerzel et al. | |
| 4,234,435 A | 11/1980 | Meinhardt et al. | |
| 4,240,916 A | 12/1980 | Rossi | |
| 4,605,808 A | 8/1986 | Samson | |
| 4,863,623 A * | 9/1989 | Nalesnik | 508/256 |
| 5,112,507 A | 5/1992 | Harrison | |
| 5,138,688 A | 8/1992 | Debortoli | |
| 5,241,003 A | 8/1993 | Degonia et al. | |
| 5,286,799 A | 2/1994 | Harrison et al. | |
| 5,319,030 A | 6/1994 | Harrison et al. | |
| 5,427,702 A | 6/1995 | Chung et al. | |
| 5,523,417 A | 6/1996 | Blackborow et al. | |
| 5,633,326 A * | 5/1997 | Patil et al. | 525/327.6 |
| 5,670,462 A | 9/1997 | Barr et al. | |
| 5,744,429 A | 4/1998 | Chung et al. | |
| 5,792,729 A | 8/1998 | Harrison et al. | |
| 5,814,706 A * | 9/1998 | Yu et al. | 525/327.6 |
| 6,030,930 A | 2/2000 | Emert et al. | |
| 6,117,825 A | 9/2000 | Liu et al. | |
| 6,156,850 A | 12/2000 | Harrsion et al. | |
| 6,284,716 B1 | 9/2001 | Gunther et al. | |
| 6,451,920 B1 | 9/2002 | Harrison et al. | |
| 6,512,055 B2 | 1/2003 | Gunther et al. | |

FOREIGN PATENT DOCUMENTS

| | | |
|---|---|---|
| EP | 0 355 895 A2 | 2/1990 |
| EP | 0 587 381 A1 | 3/1994 |
| EP | 0 602 863 A1 | 6/1994 |
| EP | 0 775 740 A2 | 5/1997 |
| EP | 0 719 290 B1 | 8/1997 |
| EP | 1 316 564 A2 | 6/2003 |
| EP | 1 717 300 A1 | 4/2006 |
| EP | 1 760 139 A2 | 3/2007 |
| WO | 0 134 663 A1 | 5/2001 |

* cited by examiner

*Primary Examiner*—Bernard Lipman
(74) *Attorney, Agent, or Firm*—Josetta I. Jones; M. Carmen & Associates, PLLC

(57) ABSTRACT

An oil-soluble lubricating oil additive composition prepared by the process which comprises reacting a copolymer, with at least one ether compound and with at least one aromatic amine.

46 Claims, 1 Drawing Sheet

Figure 1: Effect of diluent oil in the starting reaction mixture on the product viscosity at normalized concentration
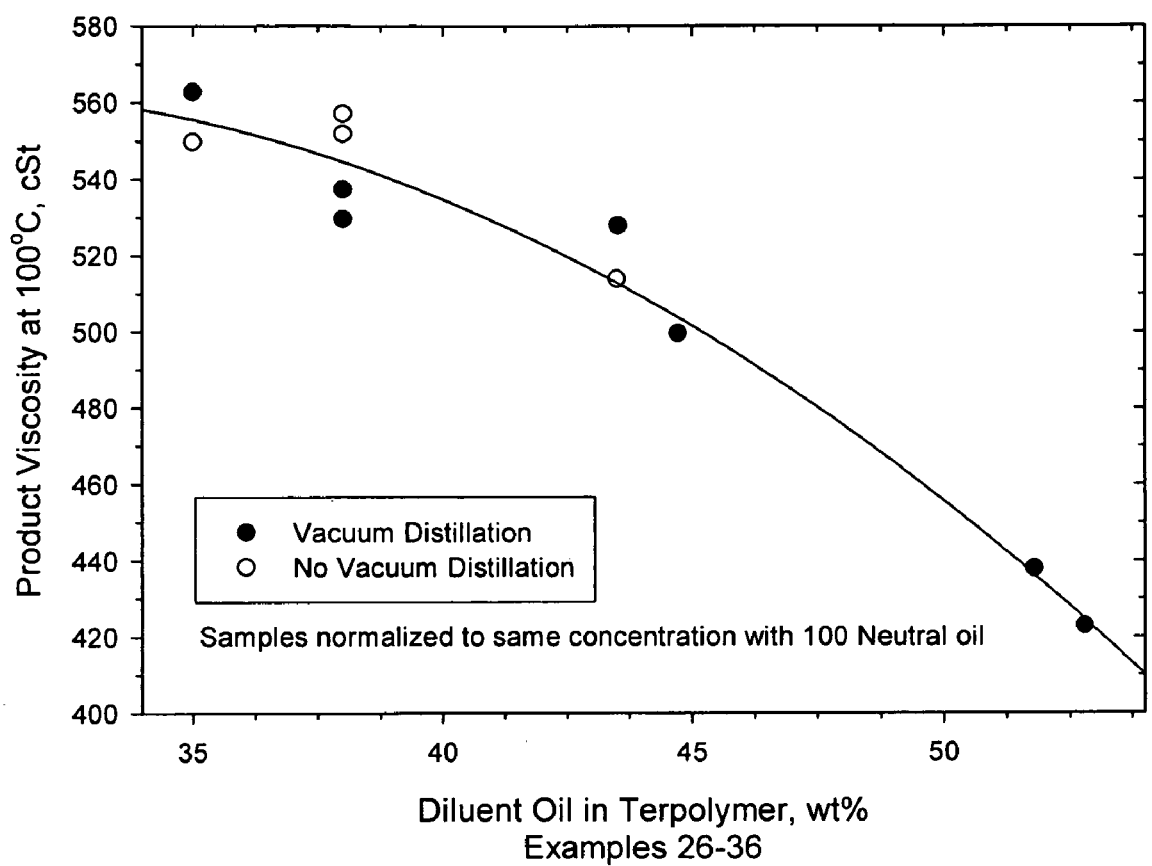
Diluent Oil in Terpolymer, wt%
Examples 26-36

LUBRICATING OIL ADDITIVE COMPOSITION AND METHOD OF MAKING THE SAME

This application is a Continuation-In-Part of prior co-pending U.S. patent application Ser. No. 11/118,550, filed Apr. 29, 2005.

FIELD OF THE INVENTION

The present invention is directed to an improved dispersant additive composition that is used in engine oils; and it is also directed to the process of making the same.

Background of the Invention

It is known to employ nitrogen containing dispersants and/or detergents in the formulation of lubricating oil compositions. Many of the known dispersant/detergent compounds are based on the reaction of an alkenylsuccinic acid or anhydride with an amine or polyamine to produce an alkenylsuccinimide or an alkenyl succinamic acid as determined by selected conditions of reaction. One problem facing the lubricant manufacturer is dispersancy of particulate matter in internal combustion engines. Failure to have adequate particulate matter dispersancy may result in filter plugging, sludge accumulation, and oil thickening.

Description of the Related Art

Liu et al., U.S. Pat. No. 6,117,825, discloses a lubricating oil composition that comprises a major amount of an oil of lubricating viscosity; and a minor amount of a synergistic combination of an antioxidant-dispersant additive and a dispersant additive, said combination comprising: (i) a polyisobutylene succinimide (PIBSAD) and (ii) an ethylene-propylene succinimide (LEPSAD). Nalesnik, U.S. Pat. No. 5,138,688, discloses an additive composition comprising an oxidized ethylene copolymer or terpolymer of a $C_3$-$C_{10}$ alpha-monoolefin and, optionally, a non-conjugated diene or triene which has been reacted with a formaldehyde compound and with an amino-aromatic polyamine compound.

Günther et al., U.S. Pat. No. 6,512,055, discloses a copolymer obtained by free radical copolymerization of at least one monoethylenically unsaturated $C_4$-$C_6$ dicarboxylic acid or anhydride thereof, an oligomer, and one monoethylenically unsaturated compound.

Günther et al., U.S. Pat. No. 6,284,716, discloses a lubricating oil composition comprising a lubricant oil and a copolymer obtained by free radical copolymerization of at least one monoethylenically unsaturated $C_4$-$C_6$ dicarboxylic acid or anhydride thereof, an oligomer, and one monoethylenically unsaturated compound, wherein the copolymer is further reacted with an amine.

Harrison et al., U.S. Pat. No. 5,792,729, discloses a dispersant terpolymer and polysuccinimide compositions derived from the terpolymers. The terpolymer is obtained by free radical copolymerization of an unsaturated acidic reagent, a 1-olefin, and a 1,1-disubstituted olefin in the presence of a free radical initiator.

Barr et al., U.S. Pat. No. 5,670,462, discloses a lubricating oil additive composition that is the reaction product of (i) a copolymerized olefin and unsaturated carboxylic acylating agent monomer with a free radical initiator and (ii) a succinimide prepared from an acyclic hydrocarbyl substituted succinic acylating agent and a polyamine wherein the hydrocarbyl substituted succinic acylating agent is prepared by reacting a polyolefin and an acylating agent under conditions such that at least 75 mole % of the starting polyolefin is converted to the hydrocarbyl-substituted succinic acylating agent.

Harrison et al., U.S. Pat. No. 6,451,920, discloses copolymerizing a polyalkene and an unsaturated acidic reagent, followed by reacting any unreacted polyalkene with the unsaturated acidic reagent at elevated temperatures in the presence of a strong acid.

Chung et al., U.S. Pat. Nos. 5,427,702 and 5,744,429, disclose a mixture of derivatized ethylene-alpha olefin copolymers, wherein functional groups are grafted onto the copolymer. The functionalized copolymer is mixed with at least one of an amine, alcohol, including polyol, amino alcohol etc. to form multi-functional viscosity index improver additive components.

Harrison et al., U.S. Pat. No. 5,112,507, discloses novel copolymers of unsaturated acidic reactants and high molecular weight olefins wherein at least 20% of the total high molecular weight olefin comprises the alkylvinylidene isomer which copolymers are useful as dispersants in lubricating oils and fuels and also may be used to prepare polysuccinimides and other post-treated additives useful in lubricating oils and fuels.

BRIEF DESCRIPTION OF THE DRAWING

FIG. 1 illustrates the effect on viscosity of the product when diluent oil is admixed with a copolymer reactant that is further reacted with an ether compound and an amino aromatic compound.

SUMMARY OF THE INVENTION

In its broadest embodiment, the present invention is directed to an oil-soluble lubricating oil additive composition prepared by the process which comprises reacting
(A) at least one of the following copolymers:
  (i) a copolymer obtained by free radical copolymerization of components comprising:
    (a) at least one monoethylenically unsaturated $C_3$-$C_{28}$ monocarboxylic acid or ester thereof, or $C_4$-$C_{28}$ dicarboxylic acid, anhydride or ester thereof;
    (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
    (c) at least one monoolefin compound which is copolymerizable with the monomers of (a) and (b) and is selected from the group consisting of:
      (1) an alkyl vinyl ether and an allyl alkyl ether where the alkyl group is hydroxyl, amino, dialkylamino or alkoxy substituted or is unsubstituted, and containing from about 1 to about 40 carbon atoms;
      (2) an alkyl amine and an N-alkylamide of a monoethylenically unsaturated mono- or dicarboxylic acid of from about 3 to about 10 carbon atoms where the alkyl substituent contains from about 1 to about 40 carbon atoms;
      (3) an N-vinylcarboxamide of carboxylic acids of from about 1 to about 8 carbon atoms;
      (4) an N-vinyl substituted nitrogen-containing heterocyclic compound; and
      (5) at least one 1-olefin comprising from about 2 to about 40 carbon atoms or at least one polyolefin comprising from about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);

(ii) a copolymer obtained by reacting compound (i)(a) and compound (i)(b) in the presence of a free radical initiator;

(iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c), wherein the copolymer of (i), (ii) or (iii); with (B) at least one ether compound selected from the group consisting of an ether polyamine, a polyether polyamine, a polyether amino alcohol, a polyether amino thiol, and a polyether polyol; and (C) at least one aromatic amine.

The present invention is also directed to a lubricating oil composition comprising a major amount of an oil of lubricating viscosity and a minor amount of the lubricating oil additive composition prepared by the process which comprises reacting (A) at least one of the following copolymers:

(i) a copolymer obtained by free radical copolymerization of components comprising:

(a) at least one monoethylenically unsaturated $C_3$-$C_{28}$ monocarboxylic acid or ester thereof, or $C_4$-$C_{28}$ dicarboxylic acid, anhydride or ester thereof;

(b) at least one 1-olefin comprising about 2 to about 40 carbon atoms or at least one polyolefin comprising from about 4 to about 360 carbon atoms and having a terminal copolymerizable group in the form of a vinyl, vinylidene or alkyl vinylidene group or mixtures thereof; and (c) at least one monoolefin compound which is copolymerizable with the monomers of (a) and (b) and is selected from the group consisting of:

(1) an alkyl vinyl ether and an allyl alkyl ether where the alkyl group is hydroxyl, amino, dialkylamino or alkoxy substituted or is unsubstituted, and containing from about 1 to about 40 carbon atoms;

(2) an alkyl amine and an N-alkylamide of a monoethylenically unsaturated mono- or dicarboxylic acid of from about 3 to about 10 carbon atoms where the alkyl substituent contains from about 1 to about 40 carbon atoms;

(3) an N-vinylcarboxamide of carboxylic acids of from about 1 to about 8 carbon atoms;

(4) an N-vinyl substituted nitrogen-containing heterocyclic compound; and (5) at least one 1-olefin comprising from about 2 to about 40 carbon atoms or at least one polyolefin comprising from about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);

(ii) a copolymer obtained by reacting compound (i)(a) and compound (i)(b) in the presence of a free radical initiator;

(iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with (B) at least one ether compound selected from the group consisting of an ether polyamine, a polyether polyamine, a polyether amino alcohol, a polyether amino thiol, and a polyether polyol; and (C) at least one aromatic amine.

The present invention is also directed to a method of making a lubricating oil additive composition which comprises reacting (A) at least one of the following copolymers:

(i) a copolymer obtained by free radical copolymerization of components comprising:

(a) at least one monoethylenically unsaturated $C_3$-$C_{28}$ monocarboxylic acid or ester thereof, or $C_4$-$C_{28}$ dicarboxylic acid, anhydride or ester thereof;

(b) at least one 1-olefin comprising from about 2 to about 40 carbon atoms or at least one polyolefin comprising from about 4 to about 360 carbon atoms and having a terminal copolymerizable group in the form of a vinyl, vinylidene or alkyl vinylidene group or mixtures thereof; and (c) at least one monoolefin compound which is copolymerizable with the monomers of (a) and (b) and is selected from the group consisting of:

(1) an alkyl vinyl ether and an allyl alkyl ether where the alkyl group is hydroxyl, amino, dialkylamino or alkoxy substituted or is unsubstituted, and containing from about 1 to about 40 carbon atoms;

(2) an alkyl amine and an N-alkylamide of a monoethylenically unsaturated mono- or dicarboxylic acid of from about 3 to about 10 carbon atoms where the alkyl substituent contains from about 1 to about 40 carbon atoms;

(3) an N-vinylcarboxamide of carboxylic acids of from about 1 to about 8 carbon atoms;

(4) an N-vinyl substituted nitrogen-containing heterocyclic compound; and (5) at least one 1-olefin comprising from about 2 to about 40 carbon atoms or at least one polyolefin comprising from about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);

(ii) a copolymer obtained by reacting compound (i)(a) and compound (i)(b) in the presence of a free radical initiator;

(iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with (B) at least one ether compound selected from the group consisting of an ether polyamine, a polyether polyamine, a polyether amino alcohol, a polyether amino thiol, and a polyether polyol; and (C) at least one aromatic amine.

Accordingly, the present invention relates to multi-functional lubricating oil additives which are useful as dispersants in an internal combustion engine.

DETAILED DESCRIPTION OF THE INVENTION

While the invention is susceptible to various modifications and alternative forms, specific embodiments thereof and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Definitions

The following terms used with the description are defined as such:

The term "PIB" is an abbreviation for polyisobutene.

The term "PIBSA" is an abbreviation for polyisobutenyl succinic anhydride.

The term "polyPIBSA" refers to a class of copolymers employed within the scope of the present invention which are copolymers of polyisobutene and a monoethylenically unsaturated $C_3$-$C_{28}$ monocarboxylic acid or ester thereof, or a $C_4$-$C_{28}$ dicarboxylic acid, anhydride or ester thereof which have carboxyl groups, preferably succinic groups, and polyisobutyl groups. The preferred polyPIBSA is a copolymer of polyisobutene and maleic anhydride having the general formula:

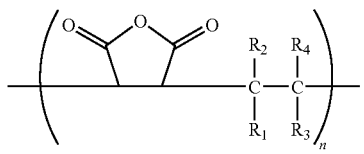

wherein n is one or greater; $R_1$, $R_2$, $R_3$ and $R_4$ are selected from hydrogen, methyl and polyisobutyl having at least about 30 carbon atoms (preferably at least about 50 carbon atoms) wherein either $R_1$ and $R_2$ are hydrogen and one of $R_3$ and $R_4$ is methyl and the other is polyisobutyl, or $R_3$ and $R_4$ are hydrogen and one of $R_1$ and $R_2$ is methyl and the other is polyisobutyl. The polyPIBSA copolymer may be alternating, block, or random.

The term "succinic group" refers to a group having the formula:

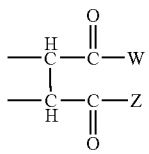

wherein W and Z are independently selected from the group consisting of —OH, —Cl, —O— lower alkyl or taken together are —O— to form a succinic anhydride group. The term "—O— lower alkyl" is meant to include alkoxy of from about 1 to about 6 carbon atoms.

The term "degree of polymerization" refers to the average number of repeating structural units in the polymer chain.

The term "terpolymer" refers to a polymer derived from the free radical copolymerization of at least 3 monomers.

The term "1-olefin" refers to a monounsaturated olefin that has the double bond in the 1-position. They can also be called alpha-olefins, and have the following structure:

where R is the rest of the olefin molecule.

The term "1,1-disubstituted olefin" refers to a disubstituted olefin, also called a vinylidene olefin, that has the following structure:

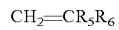

wherein $R_5$ and $R_6$ are the same or different, and constitute the rest of the olefin molecule. Preferably, either $R_5$ or $R_6$ is a methyl group, and the other is not.

The term "succinimide" is understood in the art to include many of the amide, imide, etc. species which are also formed by the reaction of a succinic anhydride with an amine. The predominant product, however, is succinimide and this term has been generally accepted as meaning the product of a reaction of an alkenyl- or alkyl-substituted succinic acid or anhydride with an amine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference.

The term "polysuccinimide" refers to the reaction product of a succinic group-containing copolymer with an amine.

The term "alkenyl or alkylsuccinic acid derivative" refers to a structure having the formula:

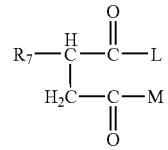

wherein $R_7$ is selected from hydrogen, methyl and polyisobutyl having at least about 30 carbon atoms (preferably at least about 50 carbon atoms); wherein L and M are independently selected from the group consisting of —OH, —Cl, —O— lower alkyl or taken together are —O— to form an alkenyl or alkylsuccinic anhydride group.

The term "alkylvinylidene" or "alkylvinylidene isomer" refers to high molecular weight olefins and polyalkylene components having the following vinylindene structure:

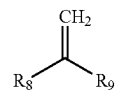

wherein $R_8$ is alkyl or substituted alkyl of sufficient chain length to give the resulting molecule solubility in lubricating oils and fuels, thus $R_8$ generally has at least about 30 carbon atoms, preferably at least about 50 carbon atoms and $R_9$ is lower alkyl of from about 1 to about 6 carbon atoms.

The term "soluble in lubricating oil" refers to the ability of a material to dissolve in aliphatic and aromatic hydrocarbons such as lubricating oils or fuels in essentially all proportions.

The term "high molecular weight olefins" refers to olefins (including polymerized olefins having a residual unsaturation) of sufficient molecular weight and chain length to lend solubility in lubricating oil to their reaction products. Typically olefins having about 30 carbons or more suffice.

The term "high molecular weight polyalkyl" refers to polyalkyl groups of sufficient molecular weight such that the products prepared having such sufficient molecular weight are soluble in lubricating oil. Typically these high molecular weight polyalkyl groups have at least about 30 carbon atoms, preferably at least about 50 carbon atoms. These high molecular weight polyalkyl groups may be derived from high molecular weight polyolefins.

The term "amino" refers to —$NR_{10}R_{11}$ wherein $R_{10}$ and $R_{11}$ are independently hydrogen or a hydrocarbyl group.

The term "alkyl" refers to both straight- and branched-chain alkyl groups.

The term "lower alkyl" refers to alkyl groups having from about 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, iso-pentyl, n-hexyl and the like.

The term "polyalkyl" refers to an alkyl group that is generally derived from polyolefins which are polymers or copolymers of mono-olefins, particularly 1-mono-olefins, such as ethylene, propylene, butylene, and the like. Preferably, the mono-olefin employed will have from about 2 to about 24 carbon atoms, and more preferably, from about 3 to about 12 carbon atoms. More preferred mono-olefins include propylene, butylene, particularly isobutylene, 1-octene and 1-decene. Preferred, polyolefins prepared from such mono-olefins include polypropylene, polybutene, especially polyisobutene.

The Lubricating Oil Additive Composition

One embodiment of the present invention is an oil-soluble lubricating oil additive composition prepared by the process which comprises reacting (A) at least one of the following copolymers:
(i) a copolymer obtained by free radical copolymerization of components comprising:
(a) at least one monoethylenically unsaturated $C_3$-$C_{28}$ monocarboxylic acid or ester thereof, or $C_4$-$C_{28}$ dicarboxylic acid, anhydride or ester thereof;
(b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
(c) at least one monoolefin compound which is copolymerizable with the monomers of (a) and (b) and is selected from the group consisting of:
(1) an alkyl vinyl ether and an allyl alkyl ether where the alkyl group is hydroxyl, amino, dialkylamino or alkoxy substituted or is unsubstituted, and containing 1 to 40 carbon atoms;
(2) an alkyl amine and an N-alkylamide of a monoethylenically unsaturated mono- or dicarboxylic acid of 3 to 10 carbon atoms where the alkyl substituent contains 1 to 40 carbon atoms;
(3) an N-vinylcarboxamide of carboxylic acids of 1 to 8 carbon atoms;
(4) an N-vinyl substituted nitrogen-containing heterocyclic compound; and
(5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
(ii) a copolymer obtained by reacting compound (i)(a) and compound (i)(b) in the presence of a free radical initiator;
(iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with (B) at least one ether compound selected from the group consisting of an ether polyamine, a polyether polyamine, a polyether amino alcohol, a polyether amino thiol, and a polyether polyol; and (C) at least one aromatic amine.

Copolymer (i)

(a) The Monoethylenically Unsaturated Monocarboxylic Acid or Ester Thereof or Dicarboxylic Acid, Anhydride or Ester Thereof In the present invention, at least one monoethylenically unsaturated $C_3$-$C_{28}$ monocarboxylic acid or ester thereof, or $C_4$-$C_{28}$ dicarboxylic acid, anhydride or ester thereof is used to prepare the copolymers of copolymer (i). Preferably the at least one monoethylenically unsaturated $C_3$-$C_{28}$ monocarboxylic acid or ester thereof, or $C_4$-$C_{28}$ dicarboxylic acid, anhydride or ester thereof is a dicarboxylic acid, anhydride or ester thereof.

The general formula of the preferred dicarboxylic acid, anhydride or ester thereof is as follows:

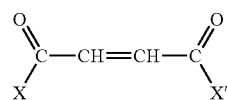

wherein X and X' are the same or different, provided that at least one of X and X' is a group that is capable of reacting to esterify alcohols, form amides or amine salts with ammonia or amines, form metal salts with reactive metals or basically reacting metal compounds and otherwise function as acylating agents. Typically, X and/or X' is —OH, —O-hydrocarbyl, OM+ where M+ represents one equivalent of a metal, ammonium or amine cation, —$NH_2$, —Cl, —Br, and taken together X and X' can be —O— so as to form an anhydride. Preferably X and X' are such that both carboxylic functions can enter into acylation reactions. Maleic anhydride is a preferred reactant. Other suitable reactants include electron-deficient olefins such as monophenyl maleic anhydride; monomethyl, dimethyl, monochloro, monobromo, monofluoro, dichloro and difluoro maleic anhydride; N-phenylmaleimide and other substituted maleimides, isomaleimides; fumaric acid, maleic acid, alkyl hydrogen maleates and fumarates, dialkyl fumarates and maleates, fumaronilic acids and maleanic acids; and maleonitrile and fumaronitrile.

Suitable monomers for (a) are monoethylenically unsaturated dicarboxylic acids or anhydrides of from about 4 to 28 carbon atoms selected from the group consisting of maleic acid, fumaric acid, itaconic acid, mesaconic acid, methylenemalonic acid, citraconic acid, maleic anhydride, itaconic anhydride, citraconic anhydride and methylenemalonic anhydride and mixtures of these with one another, among which maleic anhydride is preferred.

Other suitable monomers are monoethylenically unsaturated $C_3$-$C_{28}$-monocarboxylic acids selected from the group consisting of: acrylic acid, methacrylic acid, dimethacrylic acid, ethylacrylic acid, crotonic acid, allylacetic acid and vinylacetic acid, among which acrylic and methacrylic acid are preferred. Another group of suitable monomers is $C_1$-$C_{40}$ alkyl esters of monoethylenecially unsaturated $C_3$-$C_{10}$ mono- or dicarboxylic acids such as ethyl acrylate, butyl acrylate, 2-ethyl acrylate, decyl acrylate, docedyl acrylate, loctadecyl acrylate and the esters of industrial alcohol mixtures of from about 14 to 28 carbon atoms, ethyl methacrylate, 2-ethylhexyl methacrylate, decyl methacrylate, octadecyl methacrylate, monobutyl maleate, dibutyl maleate, monodecyl maleate, didodecyl maleate, monooctadecyl maleate, and dioctadecyl maleate.

(b) The 1-Olefin or Polyolefin

In the present invention at least one 1-olefin comprising about 2 to 40 carbon atoms or at least one polyolefin comprising about 4 to 360 carbon atoms and having a terminal copolymerizable group in the form of vinyl, vinylidene or alkyl vinylidene group is employed.

Suitable 1-olefins for preparing copolymer (i) comprise from about 2 to about 40 carbon atoms, preferably from about 6 to about 30 carbon atoms, such as decene, dodecene, octadecene and mixtures of $C_{20}$-$C_{24}$-1-olefins and $C_{24}$-$C_{28}$-1-olefins, more preferably from about 10 to about 20 carbon atoms. Preferably 1-olefins, which are also known as alpha olefins, with number average molecular weights in the range 100-4,500 or more are preferred, with molecular weights in the range of 200-2,000 being more preferred. For example, alpha olefins obtained from the thermal cracking of paraffin wax. Generally, these olefins range from about 5 to about 20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica. Preferably, 1-olefins from $C_6$-$C_{30}$ are used because these materials are commercially readily available, and because they offer a desirable balance of the length of the molecular tail, and the solubility of the terpolymer in nonpolar solvents. Mixtures of olefins may also be employed.

Suitable polyolefins for preparing copolymer (i) are polyolefins comprising about 4 to about 360 carbon atoms. These polymers have a number average molecular weight ($M_n$) of from about 56 to about 5000 g/mol. Examples of these are oligomers of ethylene, of butene, including isobutene, and of branched isomers of pentene, hexene, octene and of decene, the copolymerizable terminal group of the oligomer being present in the form of a vinyl, vinylidene or alkylvinylidene group, oligopropenes and oligopropene mixtures of from about 9 to about 200 carbon atoms and in particular oligoisobutenes, as obtainable, for example, according to DE-A 27 02 604, corresponding U.S. Pat. No. 4,152,499, are preferred. Mixtures of the stated oligomers are also suitable, for example, mixtures of ethylene and other alpha olefins. Other suitable polyolefins are described in U.S. Pat. No. 6,030,930 which is herein incorporated by reference. The molecular weights of the oligomers may be determined in a conventional manner by gel permeation chromatography.

The copolymerizable polyolefin that is reacted with the unsaturated mono- or di-carboxylic reactant are polymers comprising a major amount of $C_2$-$C_8$ mono-olefin, e.g., ethylene, propylene, butylene, isobutylene and pentene. These polymers can be homopolymers such as polyisobutylene as well as copolymers of 2 or more such olefins such as copolymers of: ethylene and propylene, butylene, and isobutylene, etc. Other copolymers include those in which a minor amount of the copolymer monomers, e.g., from about 1 to about 20 mole % is a $C_4$-$C_8$ nonconjugated diolefin, e.g., a copolymer of isobutylene and butadiene or a copolymer of ethylene, propylene and 1,4-hexadiene, etc.

The polyolefin polymer usually contains from about 4 to about 360 carbon atoms, although preferably 8 to 200 carbon atoms; and more preferably from about 12 to about 175 carbon atoms.

Since the high molecular weight olefins used to prepare the copolymers of the present invention are generally mixtures of individual molecules of different molecular weights, individual copolymer molecules resulting will generally contain a mixture of high molecular weight polyalkyl groups of varying molecular weight. Also, mixtures of copolymer molecules having different degrees of polymerization will be produced.

The copolymers of the present invention have an average degree of polymerization of 1 or greater, preferably from about 1.1 to about 20, and more preferably from about 1.5 to about 10.

(c) The Mono-olefin Compound

The present invention employs at least one monoolefin compound which is copolymerizable with the monomers of (a) and (b) and is selected from the group consisting of:

(1) an alkyl vinyl ether and an allyl alkyl ether where the alkyl group is hydroxyl, amino, dialkylamino or alkoxy substituted or is unsubstituted, and containing from about 1 to about 40 carbon atoms;

(2) an alkyl amine and an N-alkylamide of a monoethylenically unsaturated mono- or dicarboxylic acid of from about 3 to about 10 carbon atoms where the alkyl substituent contains from about 1 to about 40 carbon atoms;

(3) an N-vinylcarboxamide of carboxylic acids of from about 1 to about 8 carbon atoms;

(4) an N-vinyl substituted nitrogen-containing heterocyclic compound; and (5) at least one 1-olefin comprising about 2 to 40 carbon atoms or at least one polyolefin comprising from about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);

(1)

Suitable monomers include the following: vinyl and allyl alkyl ethers where the alkyl radical is of about 1 to about 40 carbon atoms are also suitable, and the alkyl radical may carry further substituents, such as hydroxyl, amino, dialkyamino or alkoxy. Examples are methyl vinyl ether, ethyl vinyl ether, propyl vinyl ether, isobutyl vinyl ether, 2-ethylhexyl vinyl ether, decylvinyl ether, dodecyl vinyl ether, octadecyl vinyl ether, 2-(diethylyamino)ethyl vinyl ether, 2-(di-n-butylamino)ethyl vinyl ether, and the corresponding allyl ethers.

(2)

Another group of monomers comprises $C_1$-$C_{40}$ alkyl amines and $C_1$-$C_{40}$ —N— alkylamides of monoethylenically unsaturated $C_3$-$C_{10}$-mono- or dicarboxylic acids, such as dimethylaminoethyl acrylate, diethylaminoethyl acrylate, dibutylaminoethyl methacrylate, acrylamide, methacrylamide, N-tert-butylacrylamide, N-octylacrylamide, N,N'-dibutylacrylamide, N-dodecylmethacrylamide and N-octadecylmethacrylamide.

(3)

Another group of monomers includes the following: N-vinylcarboxamides of carboxylic acids of from about 1 to about 8 carbon atoms, such as N-vinylformamide, N-vinyl-N-methylformamide, N-vinylacetamide, N-vinyl-N-methylacetramide, N-vinyl-N-ethylacetamide, N-vinyl-N-methylpropionamide and N-vinylpropionamide.

(4)

Another group of monomers includes the following: N-vinyl compounds of nitrogen-containing heterocyles, such as N-vinylimidazole, N-vinylmethylimidazole, N-vinylpyrrolidone and N-vinylcaprolactam.

(5)

Suitable 1-olefins comprise about 2 to 40 carbon atoms, preferably from about 8 to about 30 carbon atoms, such as decene, dodecene, octadecene and mixtures of $C_{20}$-$C_{24}$-1-olefins and $C_{24}$-$C_{28}$-1-olefins. Preferably 1-olefins, which are also known as alpha olefins, with number average molecular weights in the range of from about 28 to about 560 are preferred, with molecular weights in the range of from about 112 to about 420 being more preferred. For example, alpha olefins obtained from the thermal cracking of paraffin wax may be employed. Generally, these olefins range from about 5 to about 20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica. Preferably, 1-olefins from $C_{10}$-$C_{30}$ are used because these materials are commercially readily available, and because they offer a desirable balance of the length of the molecular tail, and the solubility of the terpolymer in nonpolar solvents. Mixtures of olefins are also suitable.

Preparation of Copolymer (i)

Copolymer reactant (i) may be prepared from well known methods which are described in the art including, but not limited to, those methods which are disclosed in the following patents, which are herein incorporated by reference: Harrison et al., U.S. Pat. No. 5,792,729; Günther et al., U.S. Pat. No. 6,284,716; and Günther et al., U.S. Pat. No. 6,512,055.

In one embodiment of the present invention the copolymer reactant is a polyalkenyl succinic anhydride terpolymer. These terpolymers are composed of at least one of monomers (a) to (c) as described herein.

Typically, the terpolymers of this invention contain at least one of monomers (a) to (c) three components comprising of a monocarboxylic acid or ester thereof, or a dicarboxlylic acid or anhydride or ester thereof; a branched olefin; and a monoolefin. In general, these components react to form terpolymers which can be random terpolymers or alternating terpolymers or block terpolymers and can be prepared by known procedures for making copolymers. The monocarboxylic acid or ester thereof or dicarboxylic acid or anhydride or ester thereof is selected from those which were previously disclosed, preferably maleic anhydride.

The degree of polymerization of the terpolymers can vary over a wide range. In general, terpolymers of high molecular weight can be produced at low temperatures, and terpolymers of low molecular weight can be produced at high temperatures.

The terpolymerization is conducted in the presence of a suitable free radical initiator. Examples of suitable polymerization initiators are peroxide compounds, such as terybutyl perpivalate, terybutyl perneocecanoate, tery-butylperethylhexa noate, tertbutylperisobutyrate, di-tert-butyl peroxide, di-tert-amyl peroxide, diacetyl peroxydicaronate and dicyclohexyldicaronate, or azo compounds, such as 2,2'-azobisisobutyrontrile. The initiators may be used alone or as a mixture with one another. Redox co-initiators may also be present. Preferably, the initiator is a peroxide type initiator, e.g., di(t-butyl)peroxide, dicumyl peroxide or azo type initiator, e.g., isobutylnitrile type initiators. Procedures for preparing poly 1-olefin copolymers are, for example, described in U.S. Pat. Nos. 3,560,455 and 4,240,916, hereby incorporated by reference in their entirety. Those procedures could be used to prepare terpolymers. Both patents also describe a variety of initiators.

Copolymer (i), wherein a second olefin is employed in the reaction, can be prepared in the same manner as copolymer (ii) which is described below.

Copolymer (ii)

In another embodiment of the present invention, the copolymer reactant is a copolymer obtained by reacting (a) at least one monoethylenically unsaturated $C_3$-$C_{28}$ monocarboxylic acid or ester thereof, or a $C_4$-$C_{28}$ dicarboxylic acid, anhydride or ester thereof and (b) at least one copolymerizable polymer composed of at least 3 olefin molecules of propene or of a branched 1-olefin of from about 4 to about 10 carbon atoms, having a number average molecular weight $M_n$ of from about 112 to about 5000, and having a terminal copolymerizable group in the form of a vinyl, vinylidene or alkyl vinylidene group in the presence of a free radical initiator.

Thus, preferred copolymers of the present invention are prepared by reacting a "reactive" high molecular weight olefin in which a high proportion of unsaturation, at least about 20% is in the alkylvinylidene configuration, e.g.,

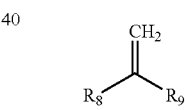

wherein $R_8$ and $R_9$ are an alkyl or substituted alkyl of sufficient chain length to give the resulting molecule stability in lubricating oils and fuels, thus $R_8$ generally has at least about 30 carbon atoms, preferably at least about 50 carbon atoms and $R_9$ is a lower alkyl of from about 1 to about 6 carbon atoms, with an unsaturated acidic reactant in the presence of a free radical initiator.

The product copolymer has alternating polyalkylene and succinic groups and has an average degree of polymerization of 1 or greater.

The preferred copolymers (ii) of the present invention have the general formula:

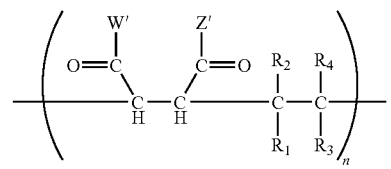

wherein W' and Z' are independently selected from the group consisting of —OH, —O— lower alkyl or taken together are —O— to form a succinic anhydride group, n is one or greater; and $R_1$, $R_2$, $R_3$ and $R_4$ are selected from hydrogen, lower alkyl of from about 1 to about 6 carbon atoms, and high molecular weight polyalkyl wherein either $R_1$ and $R_2$ are hydrogen and one of $R_3$ and $R_4$ is lower alkyl and the other is high molecular weight polyalkyl, or $R_3$ and $R_4$ are hydrogen and one of $R_1$ and $R_2$ is lower alkyl and the other is high molecular weight polyalkyl.

Copolymer (ii) may be alternating, block, or random.

In a preferred embodiment, when maleic anhydride is used as the reactant, the reaction produces copolymers predominately of the following formula:

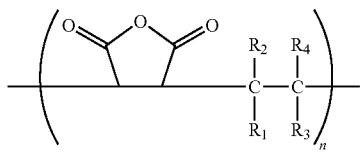

wherein n is from about 1 to about 100, preferably from about 2 to about 20, more preferably from about 2 to about 10, and $R_1$, $R_2$, $R_3$ and $R_4$ are selected from hydrogen, lower alkyl of from about 1 to about 6 carbon atoms and higher molecular weight polyalkyl, wherein either $R_1$ and $R_2$ are hydrogen and one of $R_3$ and $R_4$ is lower alkyl and the other is high molecular weight polyalkyl or $R_3$ and $R_4$ are hydrogen and one of $R_1$ and $R_2$ is lower alkyl and the other is high molecular weight polyalkyl.

Preferably, the high molecular weight polyalkyl group has at least about 30 carbon atoms (preferably at least about 50 carbon atoms). Preferred high molecular weight polyalkyl groups include polyisobutyl groups. Preferred polyisobutyl groups include those having number average molecular weights of from about 500 to about 5000, more preferably from about 900 to about 2500. Preferred lower alkyl groups include methyl and ethyl; especially preferred lower alkyl groups include methyl.

A particularly preferred class of olefin polymers comprises the polybutenes, which are prepared by polymerization of isobutene. These polybutenes are readily available commercial materials well known to those skilled in the art. Disclosures thereof will be found, for example, in U.S. Pat. Nos. 4,152,499 and 4,605,808, which are herein incorporated by reference for their disclosures of suitable polybutenes.

Preferably, 1,1-disubstituted olefins are used to provide a high molecular weight, oil soluble tail in the terpolymer. Preferably the 1,1-disubstituted olefin has a number average $M_n$ of from about 500 to about 5000. One particularly useful 1,1-disubstituted olefin is a 1,1-disubstituted polyisobutylene, such as methylvinylidene polyisobutylene.

Preferably the copolymerizable polymer comprises a high molecular weight polyalkyl group which is derived from a high molecular weight olefin. The high molecular weight olefins used in the preparation of the copolymers of the present invention are of sufficiently long chain length so that the resulting composition is soluble in and compatible with mineral oils, fuels and the like; and the alkylvinylidene isomer of the high molecular weight olefin comprises at least about 20% of the total olefin composition.

Such high molecular weight olefins are generally mixtures of molecules having different molecular weights and can have at least one branch per 6 carbon atoms along the chain, preferably at least one branch per 4 carbon atoms along the chain, and particularly preferred that there be about one branch per 2 carbon atoms along the chain. These branched chain olefins may conveniently comprise polyalkenes prepared by the polymerization of olefins of from about 3 to about 6 carbon atoms, and preferably from olefins of from about 3 to about 4 carbon atoms, and more preferably from propylene or isobutylene. The addition-polymerizable olefins employed are normally 1-olefins. The branch may be of from about 1 to about 4 carbon atoms, more usually of from about 1 to about 2 carbon atoms and preferably methyl.

The preferred alkylvinylidene isomer comprises a methyl- or ethylvinylidene isomer, more preferably the methylvinylidene isomer.

The especially preferred high molecular weight olefins used to prepare the copolymers of the present invention are polyisobutenes which comprise at least about 20% of the more reactive methylvinylidene isomer, preferably at least about 50% and more preferably at least about 70%. Suitable polyisobutenes include those prepared using $BF_3$ catalysis. The preparation of such polyisobutenes in which the methylvinylidene isomer comprises a high percentage of the total composition is described in U.S. Pat. Nos. 4,152,499 and 4,605,808.

Preparation of Copolymer (ii)

As noted above, copolymer (ii) of the present invention is prepared by reacting an olefin and an unsaturated acidic reactant in the presence of a free radical initiator. The process of the preparation of copolymer (ii) is described in Harrison, U.S. Pat. No. 5,112,507, which is herein incorporated by reference in its entirety.

The reaction may be conducted at a temperature of about −30° C. to about 210° C., preferably from about 40° C. to about 160° C. The degree of polymerization is inversely proportional to temperature. Accordingly, for the preferred high molecular weight copolymers, it is advantageous to employ lower reaction temperatures. For example, if the reaction is conducted at about 138° C., an average degree of polymerization of about 1.3 was obtained. However, if the reaction was conducted at a temperature of about 40° C., an average degree of polymerization of about 10.5 was obtained.

The reaction may be conducted neat, that is, both the high molecular weight olefin, acidic reactant and the free radical initiator are combined in the proper ratio, and then stirred at the reaction temperature.

Alternatively, the reaction may be conducted in a diluent. For example, the reactants may be combined in a solvent. Suitable solvents include those in which the reactants and free radical initiator are soluble and include acetone, tetrahydrofuran, chloroform, methylene chloride, dichloroethane, toluene, dioxane, chlorobenzene, xylenes, or the like. After the reaction is complete, volatile components may be stripped off. When a diluent is employed, it is preferably inert to the reactants and products formed and is generally used in an amount sufficient to ensure efficient mixing.

In the preparation of polyPIBSA, improved results are obtained by using PIBSA or polyPIBSA as a solvent for the reaction.

In general, the copolymerization can be initiated by any free radical initiator. Such initiators are well known in the art. However, the choice of free radical initiator may be influenced by the reaction temperature employed.

The preferred free-radical initiators are the peroxide-type polymerization initiators and the azo-type polymerization initiators. Radiation can also be used to initiate the reaction, if desired.

The peroxide-type free-radical initiator can be organic or inorganic, the organic having the general formula: $R_{12}OOR'_{13}$ where $R_{12}$ is any organic radical and $R'_{13}$ is selected from the group consisting of hydrogen and any organic radical. Both $R_{12}$ and $R'_{13}$ can be organic radicals, preferably hydrocarbon, aryl, and acyl radicals, carrying, if desired, substituents such as halogens, etc. Preferred peroxides include di-tert-butyl peroxide, dicumyl peroxide, and di-tert-amyl peroxide.

Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by alpha,alpha'-azobisisobutyronitrile, are also well-known free-radical promoting materials. These azo compounds can be defined as those having present in the molecule group —N=N wherein the balances are satisfied by organic radicals, at least one of which is preferably attached to a tertiary carbon. Other suitable azo compounds include, but are not limited to, p-bromobenzenediazonium fluoroborate; p-tolyidiazoaminobenzene; p-bromobenzenediazonium hydroxide; azomethane and phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the high molecular olefin used and the reaction conditions. The initiator must, of course, be soluble in the reaction medium. The usual concentrations of initiator are between 0.001:1 and 0.2:1 moles of initiator per mole of acidic reactant, with preferred amounts between 0.005:1 and 0.10:1.

The polymerization temperature must be sufficiently high to break down the initiator to produce the desired free-radicals. For example, using benzoyl peroxide as the initiator, the reaction temperature can be between about 75° C. and about 90° C., preferably between about 80° C. and about 85° C. higher and lower temperatures can be employed, a suitable broad range of temperatures being between about 20° C. and about 200° C., with preferred temperatures between about 50° C. and about 150° C.

The reaction pressure should be sufficient to maintain the solvent in the liquid phase. Pressures can therefore vary between about atmospheric and 100 psig or higher, but the preferred pressure is atmospheric.

The reaction time is usually sufficient to result in the substantially complete conversion of the acidic reactant and high molecular weight olefin to copolymer. The reaction time is suitable between one and 24 hours, with preferred reaction times between 2 and 10 hours.

As noted above, the subject reaction is a solution-type polymerization reaction. The high molecular weight olefin, acidic reactant, solvent and initiator can be brought together in any suitable manner. The important factors are intimate contact of the high molecular weight olefin and acidic reactant in the presence of a free-radical producing material. The reaction, for example, can be conducted in a batch system where the high molecular weight olefin is added all initially to a mixture of acidic reactant, initiator and solvent or the high molecular weight olefin can be added intermittently or continuously to the reactor. Alternatively, the reactants may be combined in other orders; for example, acidic reactant and initiator may be added to high molecular weight olefin in the reactor. In another manner, the components in the reaction mixture can be added continuously to a stirred reactor with continuous removal of a portion of the product to a recovery train or to other reactors in series. In yet another manner, the reaction may be carried out in a batch process, wherein the high molecular weight olefin is added initially to the reactor, and then the acidic reactant and the initiator are added gradually over time. The reaction can also suitably take place in a coil-type reactor where the components are added at one or more points along the coil.

Copolymer (iii)

In one embodiment, copolymer reactant (iii) is obtained by a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c).

Preparation of Copolymer (iii)

A process for the preparation of copolymer (iii) is described, for example, in Harrison, et al., U.S. Pat. No. 6,451,920, which is herein incorporated by reference in its entirety.

In process step (a) above, any unreacted olefin, generally the more hindered olefins, i.e., the beta-vinylidene, that do not react readily with the monoethylenically unsaturated $C_3$-$C_{28}$ monocarboxylic acid or ester thereof, or $C_4$-$C_{28}$ dicarboxylic acid or an anhydride or ester thereof, under free radical conditions, are reacted with monoethylenically unsaturated $C_3$-$C_{28}$ monocarboxylic acid or ester thereof, or $C_4$-$C_{28}$ dicarboxylic acid or an anhydride or ester thereof, under thermal conditions, i.e., at temperatures of from about 180° C. to about 280° C. These conditions are similar to those used for preparing thermal process PIBSA. Optionally, this reaction takes place in the presence of a strong acid, such as sulfonic acid. See for example U.S. Pat. No. 6,156,850.

Optionally, a solvent may be used to dissolve the reactants. The reaction solvent must be one which dissolves both the acidic reactant and the high molecular weight olefin. It is necessary to dissolve the acidic reactant and high molecular weight olefin so as to bring them into intimate contact in the solution polymerization reaction. It has been found that the solvent must also be one in which the resultant copolymers are soluble.

Suitable solvents include liquid saturated or aromatic hydrocarbons having from about 6 to about 20 carbon atoms; ketones having from about 3 to about 5 carbon atoms; and liquid saturated aliphatic dihalogenated hydrocarbons having from about 1 to about 5 carbon atoms per molecule, preferably from about 1 to about 3 carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the acidic reactant and high molecular weight olefin in addition to the resulting copolymers. The volume ratio of solvent to high molecular weight olefin is suitably between 1:1 and 100:1 and is preferably between 1.5:1 and 4:1.

Suitable solvents include the ketones having from about 3 to about 6 carbon atoms and the saturated dichlorinated hydrocarbons having from about 1 to about 5, more preferably from about 1 to about 3, carbon atoms.

Examples of suitable solvents include, but are not limited to:

1. ketones, such as: acetone; methylethylketone; diethylketone; and methylisobutylketone;

2. aromatic hydrocarbons, such as: benzene; xylene; and toluene;
3. saturated dihalogenated hydrocarbons, such as: dichloromethane; dibromomethane; 1-bromo-2-chloroethane; 1,1-dibromoethane; 1,1-dichloroethane; 1,2-dichloroethane; 1,3-dibromopropane; 1,2-dibromopropane; 1,2-dibromo-2-methylpropane; 1,2-dichloropropane; 1,1-dichloropropane; 1,3-dichloropropane; 1-bromo-2-chloropropane; 1,2-dichlorobutane; 1,5-dibromopentane; and 1,5-dichloropentane; or
4. mixtures of the above, such as: benzenemethylethylketone.

The copolymer is conveniently separated from solvent and any unreacted acidic reactant by conventional procedures such as phase separation, solvent distillation, precipitation and the like. If desired, dispersing agents and/or co-solvents may be used during the reaction.

The polyisobutenyl succinic anhydride (PIBSA), which may be directly added to copolymer reactant (i) or (ii), is generally prepared by a number of well-known processes including the method disclosed within. For example, there is a well-known thermal process (see, e.g., U.S. Pat. No. 3,361,673), an equally well-known chlorination process (see, e.g., U.S. Pat. No. 3,172,892), a combination of the thermal and chlorination processes (see, e.g., U.S. Pat. No. 3,912,764), catalytic strong acid processes (see, e.g., U.S. Pat. Nos. 3,819,660 and 6,156,850), and free radical processes (see, e.g., U.S. Pat. Nos. 5,286,799 and 5,319,030). Such compositions include one-to-one monomeric adducts (see, e.g., U.S. Pat. Nos. 3,219,666 and 3,381,022), as well as high succinic ratio products, adducts having alkenyl-derived substituents adducted with at least 1.3 succinic groups per alkenyl-derived substituent (see, e.g., U.S. Pat. No. 4,234,435).

Polyalkylene succinic anhydrides also can be produced thermally also from high methylvinylidene polybutene as disclosed in U.S. Pat. No. 4,152,499. This process is further discussed in U.S. Pat. No. 5,241,003 for the case where the succinic ratio is less than 1.3 and in EP 0 355 895 for the case where the succinic ratio is greater than 1.3. European Applications EP 0 602 863 and EP 0 587 381, and U.S. Pat. No. 5,523,417 disclose a procedure for washing out the polymaleic anhydride resin from polyalkylene succinic anhydride prepared from high methylvinylidene polybutene. A polyalkylene succinic anhydride with a succinic ratio of 1.0 is disclosed. One advantage of polyalkylene succinic anhydride from high methylvinylidene polybutene is that it can be prepared essentially free of chlorine. U.S. Pat. No. 4,234,435 teaches a preferred polyalkene-derived substituent group with a number average ($M_n$) in the range of from about 1500 to about 3200. For polybutenes, an especially preferred number average ($M_n$) range is from about 1700 to about 2400. This patent also teaches that the succinimides must have a succinic ratio of at least 1.3. That is, there should be at least 1.3 succinic groups per equivalent weight of polyalkene-derived substituent group. Most preferably, the succinic ratio should be from 1.5 to 2.5.

Other suitable alkenyl succinic anhydrides includes those described in U.S. Pat. No. 6,030,930. Typical alkenyl used in the preparation are ethylene and 1-butene copolymers.

(B) The Ether Compounds

In one embodiment of the present invention, the copolymer is further reacted with an ether compound capable of linking two succinimide groups. Suitable ether compounds include, but are not limited to, the following:

Polyether Polyamines

Examples of suitable polyetheramines include compounds having the following structure:

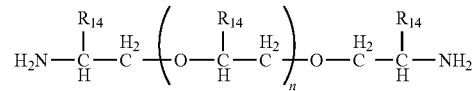

wherein $R_{14}$ is independently hydrogen or a hydrocarbyl group having from about 1 to about 4 carbons, and n is the degree of polymerization. Generally the polyether polyamines suitable for use in the present invention will contain at least about one ether unit, preferably from about 5 to about 100, more preferably from about 10 to about 50, and even more preferably from about 15 to about 25 ether units.

The polyether polyamines can be based on polymers derived from $C_2$-$C_6$ epoxides such as ethylene oxide, propylene oxide, and butylene oxide. Examples of polyether polyamines are sold under the Jeffamine® brand and are commercially available from Hunstman Corporation located in Houston, Tex.

Other examples of suitable polyetheramines include polyoxytetramethylene polyamine compounds having the following structure:

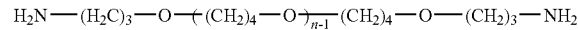

wherein n is the degree of polymerization (i.e., number of monomer ether units).

Polyether Amine Derivatives

Furthermore, the copolymer reactant may be reacted with a polyether amino alcohol or amino thiol.

Polyether Amino Alcohol

Typically, amino alcohols may be formed when the alcohol end groups of a compound are not completely converted to amines during reactions, such as reductive amination. Also, one may initiate a polymer chain (i.e. grow propylene or ethylene oxide) from an amino group and therefore have an amino on one end of the polymer chain (i.e. initiator) and an alcohol terminus, or an amine internally in the molecule with alcohol termini.

Examples of suitable polyetheramino alcohols include compounds having the following structure:

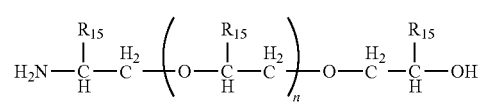

wherein $R_{15}$ is independently a hydrogen or hydrocarbyl group, having about 1 to about 4 carbons, and n is the degree of polymerization. Generally, the polyether amino alcohols, suitable for use in the present invention will contain at least about one ether unit, preferably from about 5 to about 100, more preferably from about 10 to about 50, and even more preferably from about 15 to about 25 ether units.

Other examples of suitable polyetheramino alcohols include polyoxytetramethyleneamino alcohol compounds having the following structure:

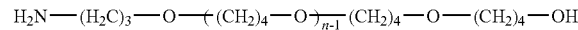

wherein n is the degree of polymerization.

Polyether Amino Thiol

Examples of suitable polyetheramino thiols include compounds having the following structure:

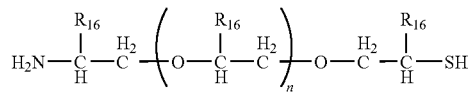

wherein $R_{16}$ is independently a hydrogen or hydrocarbyl group, having from about 1 to about 4 carbons and n is the degree of polymerization.

Other examples of suitable polyetheramino thiols include polyoxytetramethyleneamino thiol having the following structure:

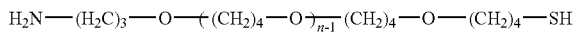

wherein n is the degree of polymerization.

Generally, the polyetheramino thiols suitable for use in the present invention will contain at least about one ether unit, preferably from about 5 to about 100, more preferably from about 10 to about 50, and even more preferably from about 15 to about 25 ether units.

Ether Polyamines

Ether Diamines

In yet another embodiment of the present invention, the copolymer may be reacted with ether diamines. Suitable diamines are reacted with the copolymer, such as decyloxypropyl-1,3-diaminopropane, isodecyloxypropyl-1,3-diaminopropane, isododecyloxypropyl-1,3-diaminopropane, dodecyl/tetradecyloxypropyl-1,3-diaminopropane, isotridecyloxypropyl-1,3-diaminopropane, tetradecyloxypropy-1,3-diaminopropane.

Polyether Polyol

In yet another embodiment of the present invention, the copolymer may be reacted with a polyether containing at least two hydroxyl end groups to form an ester. The polyether polyols have the following structure:

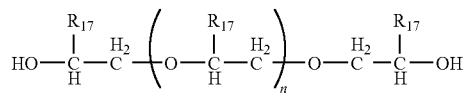

wherein $R_{17}$ is independently a hydrogen or hydrocarbyl group, having from about 1 to about 4 carbons, and n is the degree of polymerization.

Other examples of suitable polyether polyols include polyoxytetramethylene polyol compounds, such as those referred to as Terathane® which may be purchased from DuPont Corporation, Wilmington, Del., having the following structure:

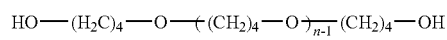

wherein n is the degree of polymerization.

Suitable polyether polyols include, but are not limited to, the following: polyoxyethylene glycol, polyoxypropylene glycol, polyoxybutylene glycol, and polyoxytetramethylene glycol.

The number average molecular weight of the presently employed polyether polyol will generally range from about 150 to about 5000, preferably from about 500 to about 2000.

Generally, the polyether compounds suitable for use in the present invention will contain at least one ether unit preferably from about 5 to about 100, more preferably from about 10 to about 50, and even more preferred from about 15 to about 25 ether units.

Generally, the polyether compounds suitable for use in the present invention may be derived from only one ether type or a mixture of ether types, such as poly(oxyethylene-co-oxypropylene) diamine. The mixture of ether units may be block, random, or alternating copolymers. The presently employed ether compounds are capable of reacting with at least two carboxylic acid groups or anhydride derivatives thereof.

Generally, the copolymer may be reacted with a mixture of polyether polyamines, polyether amino alcohols, polyether amino thiols, polyether polyols, or ether diamines to form a mixture of imides, amides and esters.

(C) Amino Aromatic Reactant

In addition to the ether compound (i.e. polyether polyamine, polyether polyamine derivative, polyether polyol, ether dimaines and ether triamine) above, the copolymer is also reacted with at least one amino aromatic selected from the group consisting of (a) N-arylphenylenediamine, (b) aminocarbazole, (c) amino-indazolinone, (d) aminomercaptotriazole, (e) aminoperimidine; and (f) aryloxyphenylene amine.

Preferred amino aromatic compounds are described as follows:

(a) an N-arylphenylenediamine represented by the formula:

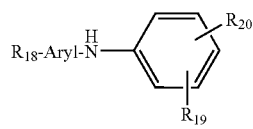

in which $R_{18}$ is H, —NHaryl, —NHalkaryl, or a branched or straight chain radical having from about 4 to about 24 carbon atoms that can be alkyl, alkenyl, alkoxyl, aralkyl or alkaryl; $R_{19}$ is —$NH_2$, —$(NH(CH_2)—_n)—_mNH_2$, —NHalkyl, —NHaralkyl, —$CH_2$-aryl-$NH_2$, in which n and m each have a value from about 1 to about 10; and $R_{20}$ is hydrogen, alkyl, alkenyl, alkoxyl, aralkyl, or alkaryl, having from about 4 to about 24 carbon atoms. Particularly preferred N-arylphenylenediamines are N-phenylphenylenediamines (NPPDA), for example, N-phenyl-1,4-phenylenediamine, N-phenyl-1,3-phenylenediamine, and N-phenyl-1,2-phenylenediamine and N-naphthyl-1,4-phenylenediamine. Other polyamines of NPPDA may also be included, such as N-aminopropyl-N'-phenylphenylenediamine.

(b) aminocarbazole represented by the formula:

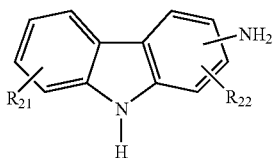

in which $R_{21}$ and $R_{22}$ each independently represent hydrogen or an alkyl or alkenyl radical having from about 1 to about 14 carbon atoms, (c) an amino-indazolinone represented by the formula:

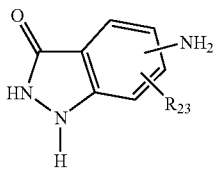

in which $R_{23}$ is hydrogen or an alkyl radical having from about 1 to about 14 carbon atoms; and (d) an aminomercaptotriazole represented by the formula:

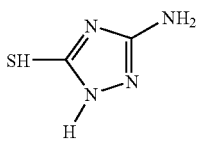

(e) an aminoperimidine represented by the formula:

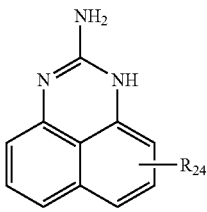

in which $R_{24}$ represents hydrogen or an alkyl radical having from about 1 to about 14 carbon atoms; and (f) an aryloxyphenyleneamine represented by the formula:

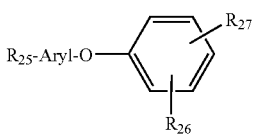

in which $R_{25}$ is H, —NHaryl, —NHalkaryl, or ranched or straight chain radical having from about 4 to about 24 carbon atoms that can be alkyl, alkenyl, alkoxyl, aralkyl or alkaryl; $R_{26}$ is —$NH_2$, —$(NH(CH_2)$—$_n)$—$_mNH_2$, —NHalkyl, or —NHaralkyl, in which n and m each have a value from about 1 to about 10; and $R_{27}$ is hydrogen, alkyl, alkenyl, alkoxyl, aralkyl or alkaryl, having from about 4 to about 24 carbon atoms. A particularly preferred aryloxyphenyleneamine is 4-phenoxyaniline.

Method of Making the Lubricating Oil Additive Composition

The lubricating oil additive composition is prepared by a process comprising charging the reactant copolymer (e.g., at least one of copolymers (i), (ii) and (iii) as described herein) in a reactor, optionally under a nitrogen purge, and heating at a temperature of from about 80° C. to about 170° C. Optionally, diluent oil may be charged optionally under a nitrogen purge in the same reactor, thereby producing a diluted copolymer reactant. The amount of diluent oil in the diluted copolymer is up to about 80 weight %, more preferred from about 20 to about 60 weight %, and most preferred from about 30 to about 50 weight %. Both an amino aromatic amine and an ether polyamine, polyetheramine, polyetheramine derivative and/or polyether polyol are charged, optionally under a nitrogen purge, to the reactor. This mixture is heated under a nitrogen purge to a temperature in range from about 130° C. to about 200° C. Optionally, a vacuum is applied to the mixture for about 0.5 to about 2.0 hours to remove excess water.

The lubricating oil additive composition can also be made using a process comprising simultaneously charging all the reactants (reactant copolymer (i), (ii), or (iii); the amino aromatic amine; and the ether compound which consists of at least one of a polyether polyamine, polyether amino alcohol, polyetheramino thiol, ether polyamine and polyether polyol) at the desired ratios into the reactor. One or more of the reactants can be charged at an elevated temperature to facilitate mixing and reaction. A static mixer can be used to facilitate mixing of the reactants as they are being charged to the reactor. The reaction is carried out for about 0.5 to about 2 hours at a temperature from about 130° C. to about 200° C. Optionally a vacuum is applied to the reaction mixture during the reaction period.

Preferably, the ratio of polyetheramine, polyetheramine derivative and/or polyetherpolyol to monoethylenically unsaturated $C_3$-$C_{28}$ monocarboxylic acid or ester or $C_4$-$C_{28}$ dicarboxylic acid, anhydride or ester is 0.45 to 0.05; more preferred, the ratio is 0.40 to 0.1; even more preferred, the ratio is 0.35 to 0.20; most preferred, the ratio is 0.33.

Preferably, the ratio of amino aromatic compound to monoethylenically unsaturated $C_3$-$C_{28}$ monocarboxylic acid or ester thereof, or $C_4$-$C_{28}$ dicarboxylic acid, anhydride or ester is 0.95 to 0.10; more preferred, the ratio is 0.40 to 0.20; even more preferred, the ratio is 0.35 to 0.25; most preferred, the ratio is 0.33.

In one embodiment of the invention, the non-free radical catalyzed reaction product of compound (i)(a) and compound (i)(b) or (i)(c), which is contacted with either copolymer (i) or copolymer (ii) or both, may be contacted in the presence of component (C) (i.e. the aromatic amine) prior to the addition of component (B) (i.e. the ether compound).

Lubricating Oil Composition

The lubricating oil additive composition described above is generally added to a base oil that is sufficient to lubricate moving parts, for example internal combustion engines, gears, and transmissions. Typically, the lubricating oil composition of the present invention comprises a major amount of an oil of lubricating viscosity and a minor amount of the lubricating oil additive composition.

The base oil employed may be any of a wide variety of oils of lubricating viscosity. The base oil of lubricating viscosity used in such compositions may be mineral oils or synthetic oils. A base oil having a viscosity of at least 2.5 cSt at 40° C.

and a pour point below 20° C., preferably at or below 0° C., is desirable. The base oils may be derived from synthetic or natural sources.

Mineral oils for use as the base oil in this invention include, for example, paraffinic, naphthenic and other oils that are ordinarily used in lubricating oil compositions. Synthetic oils include, for example, both hydrocarbon synthetic oils and synthetic esters and mixtures thereof having the desired viscosity. Hydrocarbon synthetic oils may include, for example, oils prepared from the polymerization of ethylene, polyalphaolefin or PAO oils, or oils prepared from hydrocarbon synthesis procedures using carbon monoxide and hydrogen gases such as in a Fisher-Tropsch process. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity, such as didodecyl benzene, can be used. Useful synthetic esters include the esters of monocarboxylic acids and polycarboxylic acids, as well as mono-hydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

Thus, the base oil can be a refined paraffin type base oil, a refined naphthenic base oil, or a synthetic hydrocarbon or non-hydrocarbon oil of lubricating viscosity. The base oil can also be a mixture of mineral and synthetic oils.

Method of Use of the Present Invention

The lubricating oil additive composition of the present invention is added to an oil of lubricating viscosity thereby producing a lubricating oil composition. The lubricating oil composition contacts the engine, improving dispersancy. Accordingly, the present invention is also directed to a method of improving dispersancy in an internal combustion engine which comprises operating the engine with the lubricating oil composition of the invention.

Optionally, the lubricating oil additive composition described above may be used as a fuel additive. When used in fuels, the proper concentration of the additive that is necessary to achieve the desired detergency is dependent upon a variety of factors including the type of fuel used, the presence of other detergents or dispersants or other additives, etc. Generally, however, the range of concentration of the additive in the base fuel is 10 to 10,000 weight parts per million, preferably from 30 to 5,000 parts per million of the additive. If other detergents are present, a lesser amount of the additive may be used. The additives described herein may be formulated as a fuel concentrate, using an inert stable oleophilic solvent boiling in the range of about 150-400° F. (65.6-204.4° C.). Preferred solvents boil in the gasoline or diesel fuel range. Preferably, an aliphatic or an aromatic hydrocarbon solvent is used, such as a benzene, toluene, xylene or higher-boiling aromatics or aromatic thinners. Aliphatic alcohols of about 3 to 8 carbon atoms, such as isopropanol, isobutylcarbinol, n-butanol and the like in combination with hydrocarbon solvents are also suitable for use with the fuel additive. In the fuel concentrate, the amount of the additive will be ordinarily at least 5 percent by weight and generally not exceed 70 percent by weight, preferably from 5 to 50 and more preferably from 10 to 25 weight percent.

The following examples are presented to illustrate specific embodiments of this invention and are not to be construed in any way as limiting the scope of the invention.

EXAMPLES

Example 1

Preparation of Terpolymer (Copolymer (i))

2513 grams of high methylvinylidene polyisobutylene having a number average molecular weight (Mn) of about 2300 and a methylvinylidene content of about 78% (which is available from BASF as Glissopal® 2300) was charged to a 4-L reactor equipped with agitator, temperature controller and overhead condenser and receiver. 27.3 grams 1-hexadecene was also charged to the reactor, and the agitated mixture was heated to 150° C. Traces of moisture were removed by sparging 250 $scm^3$/min nitrogen through the mixture for about an hour. After drying, the nitrogen was fed to the reactor head space at a rate of 30 $scm^3$/min. 178.8 grams maleic anhydride and 16.4 grams dicumyl peroxide in a 50% solution with toluene were fed simultaneously to the reactor over 2 hours. After the maleic anhydride and dicumyl peroxide charging were finished, the temperature of the reactor was maintained at 150° C. for another 1.5 hours. The reactor was heated to 190° C. During the heating of the reactor, the pressure was gradually lowered to 20 mm Hg when the temperature of the reactor reached 180° C. The temperature was held at 190° C. and the pressure was held at 20 mm Hg for 1 hour during which 15 grams of condensate was collected. The product was cooled and a yield of 2693 grams of copolymer (i) was obtained.

Example 2

Terpolymer Preparation with Post Treatment Step (Copolymer (iii))

67,584 grams of high methylvinylidene polyisobutylene having a number average molecular weight ($M_n$) of about 2300 and a methylvinylidene content of about 78% (which is available from BASF as Glissopal® 2300) was charged to a 30-gallon reactor equipped with agitator, temperature controller and overhead condenser and receiver. 733 grams 1-hexadecene was also charged to the reactor, and the agitated mixture was heated to 150° C. Traces of moisture were removed by sparging 6.7 sL/min nitrogen through the mixture for about an hour. After drying, the nitrogen was fed to the reactor head space at a rate of 500 $scm^3$/min. 4802 grams maleic anhydride and 441 grams of melted dicumyl peroxide were fed simultaneously to the reactor over 2 hours. After the maleic anhydride and dicumyl peroxide charging were finished, the temperature of the reactor was maintained at 150° C. for another 1.5 hours. The resulting terpolymer was then post-treated by heating from 150° C. to about 232° C. When the temperature reached about 170° C., 68.3 grams of sulfonic acid (derived from a sulfonation of a mixture of alkyl benzenes) was charged to the reactor and heating was continued until the reactor temperature reached about 232° C. Immediately after charging the sulfonic acid, 3201 grams maleic anhydride was fed to the reactor over about 1 hour. The pressure control was set to hold at 10.3 psig. The reactor temperature was held at about 232° C. and 10.3 psig for 2 hours. The reaction product was cooled to a temperature below 190° C. and then diluted with 46,600 grams of 100 Neutral oil. This yielded about 119,500 grams of oil-diluted copolymer (iii). Small amounts of sediment were removed using a pressure filter and diatomaceous earth such as Celite® 512.

Example 3

Preparation of Oil Soluble Lubricating Oil Additive 300 grams of polymer prepared according to Example 2 were charged to a reactor under a nitrogen purge and heated to a temperature of 140° C. The charged polymer was put under a vacuum for 45-60 minutes. In the same reactor, 22.5 grams of diluent oil was charged. In the same reactor, 17.72 grams of N-phenyphenylenediamine (N-PPDA) was charged under a nitrogen purge. 4.76 grams of polypropyleneoxide diamine (PPO DA, having an approximate number average molecular weight of 400) was slowly charged to the same reactor under a nitrogen purge. The reactor is heated to 150° C. under a nitrogen purge. The reactor is put under a vacuum for 1.5 hours to remove water. The charge mole ratio of N-PPDA to anhydride was 0.8. The charge mole ratio of PPO DA to anhydride was 0.10.

Following the general procedure of Example 3, Examples 4-7 and Comparative Examples E-F were carried out and are also summarized in Table 1 and Table 1A.

Example 8

Preparation of Oil Soluble Lubricating Oil Additive 88 grams of polymer prepared according to Example 1 were charged to a reactor under a nitrogen purge and heated to a temperature of 140° C. The charged polymer was put under a vacuum for 45-60 minutes. In the same reactor, 72.46 grams of diluent oil was charged. In the same reactor, 2.46 grams of N-phenyphenylenediamine (N-PPDA) was charged under a nitrogen purge. 26.04 grams of polyethyleneoxide diamine (PEO DA, having an approximate number average molecular weight of 1000) was slowly charged to the same reactor under a nitrogen purge. The reactor is heated to 150° C. under a nitrogen purge. The reactor is put under a vacuum for 1.5 hours to removes excess water. The charge mole ratio of N-PPDA to anhydride was 0.23. The charge mole ratio of PEO DA to anhydride was 0.39. Following the general procedure of Example 8, Example 9 and Comparative Examples A-D were carried out and are also summarized in Table 2 and Table 2A.

TABLE 1

Post Treated Terpolymer reacted with NPPDA or 4-PA and polyoxyalkylene diamine

| Example | Polymer Charge (g) | Amine 1 Type | Amine 1 Charge (g) | CMR Amine 1 Anhydride Content | Amine 2 Type | Amine 2 Charge (g) | CMR Amine 2 Anhydride Content |
|---|---|---|---|---|---|---|---|
| 3 | 300 | NPPDA | 17.72 | 0.80 | PPO DA 400 g/mol | 4.76 | 0.10 |
| 4 | 300 | NPPDA | 8.84 | 0.40 | PPO DA 400 g/mol | 14.4 | 0.30 |
| 5 | 75 | NPPDA | 1.29 | 0.23 | PTMO DA 1000 g/mol | 11.5 | 0.38 |
| 6 | 100 | NPPDA | 1.70 | 0.23 | PEO DA 2000 g/mol | 30.8 | 0.38 |
| 7 | 100 | 4-PA | 4.0 | 0.55 | PPO DA 4000 g/mol | 36.0 | 0.23 |

NPPDA: N-phenylphenylenediamine
PPO DA: Polypropylene oxide diamine
PEO DA: Polyethylene oxide diamine
PTMO DA: Polytetramethyleneoxide diamine
4-PA: 4-phenoxyaniline

TABLE 1A

Comparative Examples: Post Treated Terpolymer reacted with polyoxyalkylene diamine

| Example | Polymer Charge (g) | Amine 1 Type | Amine 1 Charge (g) | CMR Amine 1 Anhydride Content | Amine 2 Type | Amine 2 Charge (g) | CMR Amine 2 Anhydride Content |
|---|---|---|---|---|---|---|---|
| E | 100 | none | None | N/A | PEO DA 1100 g/mol | 28.40 | 0.5 |
| F | 80 | none | None | N/A | PEO DA 2000 g/mol | 37.87 | 0.5 |

NPPDA: N-phenylphenylenediamine
PPO DA: Polypropylene oxide diamine
PEO DA: Polyethylene oxide diamine

TABLE 2

Terpolymer (no post treatment) reacted with NPPDA and polyoxyalkylene diamine

| Example | Polymer Charge (g) | Amine 1 Type | Amine 1 Charge (9) | CMR Amine 1 Anhydride Content | Amine 2 Type | Amine 2 Charge (g) | CMR Amine 2 Anhydride Content |
|---|---|---|---|---|---|---|---|
| 8 | 88 | NPPDA | 2.46 | 0.23 | PEO DA 1000 g/mol | 26.04 | 0.39 |
| 9 | 105 | NPPDA | 4.24 | 0.33 | PEO DA 500 g/mol | 12.14 | 0.33 |

PEO DA: Polyethylene oxide diamine

TABLE 2A

Comparative Examples: Terpolymer (no post treatment) reacted with polyoxyalkylene diamine

| Example | Polymer Charge (g) | Amine 1 Type | Amine 1 Charge (g) | CMR Amine 1 Anhydride Content | Amine 2 Type | Amine 2 charge (g) | CMR Amine 2 Anhydride Content |
|---|---|---|---|---|---|---|---|
| A | 90 | none | none | N/A | PEO DA 900 g/mol | 27.89 | 0.5 |
| B | 100 | none | none | N/A | PEO DA 400 g/mol | 17.13 | 0.5 |
| C | 75 | none | none | N/A | PEO DA 1100 g/mol | 29.62 | 0.5 |
| D | 60 | none | none | N/A | PEO DA 2000 g/mol | 39.49 | 0.5 |

PEO DA: Polyethylene oxide diamine

Example 10

PolyPIBSA Preparation with Post Treatment Step (Copolymer (iii))

52,178 grams of high methylvinylidene polyisobutylene having a number average molecular weight ($M_n$) of about 2300 and a methylvinylidene content of about 78% (which is available from BASF as Glissopal® 2300) was charged to a 30-gallon reactor equipped with agitator, temperature controller and overhead condenser and receiver. 14,267 grams of a high methylvinylidene polyisobutylene having a number average molecular weight ($M_n$) of about 1000 and a methylvinylidene content of about 82% (which is available from BASF as Glissopal® 1000) was charged to the reactor and the agitated mixture was heated to 150° C. This produced a 66,445 gram blend of high methylvinylidene polyisobutylene having a number average molecular weight of about 1800. Traces of moisture were removed by sparging 6.7 sL/min nitrogen through the mixture at 150° C. for about an hour. After drying, the nitrogen was fed to the reactor head space at a rate of 500 scm³/min.reactor. 5426 grams maleic anhydride and 499 grams of melted dicumyl peroxide were fed to the reactor simultaneously over 2 hours. After the maleic anhydride and dicumyl peroxide charging were finished, the temperature of the reactor was maintained at 150° C. for another 1.5 hours. The resulting polyPIBSA was then post-treated by heating from 150° C. to about 232° C. When the temperature reached about 170° C., 66.7 grams of sulfonic acid (derived from a sulfonation of a mixture of alkyl benzenes) was charged to the reactor and heating was continued until the reactor temperature reached about 232° C. Immediately after charging the sulfonic acid, 3617 grams of maleic anhydride was fed to the reactor over about 1 hour. The pressure control was set to hold at 10.3 psig. The reactor temperature was held at about 232° C. and 10.3 psig for 2 hours. The reaction product was cooled to a temperature below 190° C. and then diluted with 46,200 grams of 100 Neutral oil. This yielded about 118,400 grams of oil-diluted polyPIBSA. Small amounts of sediment were removed using a pressure filter and diatomaceous earth such as Celite® 512.

Example 11

Preparation of Oil Soluble Lubricating Oil Additive 100 grams of polymer prepared according to Example 10 were charged to a reactor under a nitrogen purge and heated to a temperature of 140° C. The charged polymer was put under a vacuum for 45-60 minutes. In the same reactor, 66.4 grams of diluent oil was charged. In the same reactor, 1.79 grams of N-phenyphenylenediamine (N-PPDA) was charged under a nitrogen purge. 64.6 grams of polypropyleneoxide diamine (PPO DA, having an approximate number average molecular weight of 4000 g/mol) was slowly charged to the same reactor under a nitrogen purge. The reactor is heated to 150° C. under a nitrogen purge. The reactor is put under a vacuum for 1.5 hours to remove water. The charge mole ratio of N-PPDA to anhydride was 0.23. The charge mole ratio of PEO DA to anhydride was 0.38.

Following the general procedure of Example 11, Examples 12-14 and Comparative Examples G-H were carried out and are also summarized in Table 3 and Table 3A.

TABLE 3

Post-treated PolyPIBSA polymer reacted with NPPDA and polyoxyalkylene diamine

| Example | Polymer Charge (g) | Amine 1 Type | Amine 1 Charge (g) | CMR Amine 1 Anhydride Content | Amine 2 Type | Amine 2 Charge (g) | CMR Amine 2 Anhydride Content |
|---|---|---|---|---|---|---|---|
| 11 | 100 | NPPDA | 1.79 | 0.23 | PPO DA 4000 g/mol | 64.6 | 0.38 |
| 12 | 75 | NPPDA | 1.29 | 0.22 | PTMO DA 1000 g/mol | 12.5 | 0.39 |
| 13 | 75 | NPPDA | 1.29 | 0.22 | PEO DA 1000 g/mol | 12.5 | 0.39 |
| 14 | 100 | NPPDA | 1.79 | 0.23 | PPO DA 400 g/mol | 6.46 | 0.38 |

NPPDA: N-phenylphenylenediamine
PEO DA: Polyethylene oxide diamine
PPO DA: Polypropylene oxide diamine
PTMO DA: Polytetramethyleneoxide diamine

TABLE 3A

Post-treated PolyPIBSA polymer reacted with polyoxyalkylene diamine

| Example | Polymer Charge (g) | Amine 1 Type | Amine 1 Charge (g) | CMR Amine 1 Anhydride Content | Amine 2 Type | Amine 2 Charge (g) | CMR Amine 2 Anhydride Content |
|---|---|---|---|---|---|---|---|
| G | 105 | none | none | N/A | PEO DA 1100 g/mol | 32.06 | 0.5 |
| H | 85 | none | none | N/A | PEO DA 2000 g/mol | 41.46 | 0.5 |

PEO DA: Polyethylene oxide diamine

Example 15

Preparation of PolyPIBSA (Copolymer (ii))

4005 grams of high methylvinylidene polyisobutene having a number average molecular weight ($M_n$) of about 1000 and a methylvinylidene content of about 76% (which is commercially available from BASF and is known as Glissopal 1000) was charged to a reactor and the reactor was heated to a temperature of about 150° C. 589 grams maleic anhydride and 54.14 grams of dicumyl peroxide were fed to the reactor. The temperature of the reactor was maintained at 150° C. for 1.0 hour after the maleic anhydride and dicumyl peroxide are charged to the reactor. The reactor was heated to about 200° C. over a period of about 1.0 hour, after which a vacuum was applied to reduce the pressure to 0 psia while maintaining the temperature at 200° C. The reactor was held under vacuum pressure for about 1.5 hours at 200° C. The reactor pressure was then increased to ambient conditions and the product was then filtered to provide the neat product.

Example 16

Preparation of Oil Soluble Lubricating Oil Additive 75 grams of polymer prepared according to Example 15 were charged to a reactor under a nitrogen purge and heated to a temperature of 140° C. The charged polymer was put under a vacuum for 45-60 minutes. In the same reactor, 60.7 grams of diluent oil was charged. In the same reactor, 3.40 grams of N-phenyphenylenediamine (N-PPDA) was charged under a nitrogen purge. 12.3 grams of polypropyleneoxide diamine (PPO DA, having an approximate number average molecular weight of 400) was slowly charged to the same reactor under a nitrogen purge. The reactor was heated to 150° C. under a nitrogen purge. The reactor was put under a vacuum for 1.5 hours to removes excess water. The charge mole ratio of N-PPDA to anhydride was 0.23. The charge mole ratio of PEO DA to anhydride was 0.38.

Following the general procedure of Example 16, Examples 17 and 18 were carried out and are also summarized in Table 4.

TABLE 4

Post-treated PolyPIBSA polymer reacted with NPPDA and polyoxyalkylene diamine

| Example | Polymer charge (g) | Amine 1 Type | Amine 1 charge (g) | CMR Amine 1 Anhydride Content | Amine 2 Type | Amine 2 charge (g) | CMR Amine 2 Anhydride Content |
|---|---|---|---|---|---|---|---|
| 16 | 75 | NPPDA | 3.40 | 0.23 | PPO DA 400 g/mol | 12.3 | 0.38 |
| 17 | 75 | NPPDA | 11.79 | 0.80 | PEO DA 2000 g/mol | 16.0 | 0.10 |
| 18 | 75 | NPPDA | 11.05 | 0.75 | PPO DA 2000 g/mol | 20.0 | 0.125 |

NPPDA: N-phenylphenylenediamine
PEO DA: Polyethylene oxide diamine
PPO DA: Polypropylene oxide diamine Examples A-H are comparative examples, which are compared to Examples 3-9, 11-14 and 16-18 of the present invention. The comparative examples were prepared by reacting one of the copolymers employed in the present invention with a polyoxyalkylene diamine and without an aromatic amine. The product of Comparative Examples A and B exhibited haze, when dissolved in a lubricating oil, which is considered an undesirable quality in a dispersant. The remaining Comparative Examples C-H formed an insoluble gel when dissolved in a lubricating oil, which is also considered an undesirable quality in a dispersant.

By comparison Examples 3-9, 11-14 and 16-18 in which the copolymer was reacted with both a polyoxyalkene diamine and an aromatic amine, exhibited little haze and did not form a gel. The resulting products of the examples of the invention are soluble in an oil of lubricating viscosity.

Example 19

Preparation of Low Molecular Weight PIB/Maleic Anhydride Copolymer (Copolymer (ii))

3004.7 grams of polyisobutylene having a number average molecular weight ($M_n$) of about 350 and a methylvinylidene content of about 78% (which is available from Texas Petroleum Company as TPC-535) was charged to a 10-L reactor equipped with agitator, temperature controller, and overhead condenser and receiver. Traces of moisture were removed by heating to 153° C. under nitrogen for about 45 minutes. 715 grams maleic anhydride and 27.86 grams dicumyl peroxide in a 50% solution with xylene were fed simultaneously to the reactor over 297 minutes. After the maleic anhydride and dicumyl peroxide charging was finished, the temperature of the reactor was maintained at 153° C. for another 30 minutes. The reactor was heated to a temperature of about 190° C. for approximately 1 hour after which a vacuum was applied to reduce the pressure to 0 psia while maintaining the temperature at approximately 190° C. The reactor was held under vacuum pressure for about 1 hour at 190° C. The reactor pressure was then increased to ambient conditions and the product was filtered to provide the heat product.

Example 20

84.2 grams of polymer prepared according to Example 19, 56.8 grams base oil, and 17.39 grams N-phenylenephenylendiamine were charged to a 1000 mL glass reactor. A nitrogen sweep was introduced to the reactor. The reactor was heated from a temperature of 19° C. to a temperature of 160° C. and the contents were stirred. To the reactor, 450.0 grams PIBSA (based on polyisobutene having a number average molecular weight of 2300 and made according to the process described in U.S. Pat. No. 6,156,850) was charged to the reactor. To the reactor, 57.36 grams of polyethylene oxide diamine (PEO DA, having an approximate number average molecular weight of 600 and which may be purchased from Huntsman Corporation, Houston, Tex., having the trade name Jeffamine® ED-series). A vacuum was applied to the reactor. The viscosity of the resulting reaction product was 259.3 cSt at 100° C.

Following the general procedure of Example 20, Examples 21-22 were carried out and are summarized in Table 5.

TABLE 5

PIB/Maleic Anhydride Copolymer reacted with NPPDA and polyoxyalkylene diamine

| Example | Polymer Charge (g) | Amine 1 Type | Amine 1 Charge (g) | CMR Amine 1 Anhydride Content | Amine 2 Type | Amine 2 Charge (g) | CMR Amine 2 Anhydride Content | ViscositycSt @ 100° C. |
|---|---|---|---|---|---|---|---|---|
| 20 | 84.2 | NPPDA | 17.39 | | PEO DA 600 g/mol | 57.36 | | 259.3 |
| 21 | 126.3 | NPPDA | 10.9 | | TEGD | 22.17 | | 164.2 |
| 22 | 156.4 | NPPDA | 12.42 | | TEGD | 25.34 | | 124.7 |

NPPDA: N-phenylphenylenediamine
PEO DA: polyoxyethylene diamine
TEGD: triethylene glycol diamine

Example 23

Examples 5, 11 and 20, which exemplify the lubricating oil additive composition of the present invention, were evaluated for percent viscosity increase using a soot thickening bench test, which measures the ability of the formulation to disperse and control viscosity increase resulting from the addition of carbon black, a soot surrogate. Using the soot thickening bench test, the viscosity of a fresh oil is measured in centistokes. The fresh oil is then treated with 10 wt % Raven 1040 carbon black, supplied by Columbia Chemical Co., to form a mixture containing approximately 5 grams Raven 1040 carbon black and 45 grams fresh oil (test oil). The test oil, which contains carbon black, is then homogenized using a high speed tissue homogenizer for 60-75 seconds to thoroughly mix the carbon black with the fresh oil. The resulting test oil containing carbon black is then degassed at 100° C. for 30 minutes. The viscosity of the oil containing carbon black is measured according to methods that are well known in the art. The percent viscosity increase is calculated according to the following formula:

$$\% \text{ viscosity increase} = [(\text{vis}_{cbo} - \text{vis}_{fo})/(\text{vis}_{fo}) \times 100]$$

$\text{vis}_{cbo}$: viscosity of carbon black in oil
$\text{vis}_{fo}$: viscosity of fresh oil Using the soot thickening bench test, the percent viscosity increase calculated for the additive composition of for Examples 5, 11, and 20 in a formulated oil was compared to a formulated oil that does not contain the lubricating oil additive composition of the present invention. The following additives were blended to make an additive package: 0.8 wt % of a metal corrosion inhibitor and an oxidation inhibitor package, 0.2 wt % friction modifier, 0.2 wt % pour point depressant, 3.9 wt % of a calcium based detergent package containing a phenate and a sulfonate, 1.89 wt % zinc dithiophosphate, 5.0 parts per million foam inhibitor, and 6.6 wt % viscosity index improver. This blended additive package was added to a mixture of basestocks which consists of 67.0 wt % EHC60 oil, 9.0 wt % Exxon 150N oil, and 24 wt % Exxon600N oil (all of which may be purchased from Exxon-Mobil Corporation, Fairfax, Va.) to provide the comparative oil formulation. To prepare the formulated lubricating oil composition of the present invention, approximately 7.2 wt % of the additive composition of Examples 5, 11, and 20 was top treated to the formulated comparison oil.

The results of the soot thickening bench test are summarized in Table 6.

TABLE 6

Soot Thickening Bench Test Results

| Example | % Viscosity Increase | Sample Description |
|---|---|---|
| 5 | 57.5 | Post Treated Terpolymer reacted with NPPDA and polyoxyalkylene diamine |
| 11 | 283.4 | Post-treated PolyPIBSA polymer reacted with NPPDA and polyoxyalkylene diamine |
| 20 | 44.0 | PIB/Maleic Anhydride Copolymer reacted with NPPDA and polyoxyalkylene diamine |
| Comparison | >350.0 (too viscose to measure) | No copolymer/NPPDA/polyoxyalkylene diamine dispersant additive. |

The results of the soot thickening bench test indicate that the percent viscosity increase using the lubricating oil additive composition of the present invention was lower than the percent viscosity increase in a formulated oil that does not contain the lubricating oil additive composition of the present invention, which was too viscous to measure since the test employed only measures percent viscosity increase up to 350%. This test indicates that the lubricating oil additive composition of the present invention has good dispersant properties.

Example 24

Terpolymer Preparation 71,277 grams of high methylvinylidene polyisobutylene having a number average molecular weight (Mn) of about 2300 and a methylvinylidene content of about 82% (which is available from BASF as Glissopal® 2300) was charged to a 30-gallon reactor equipped with agitator, temperature controller, pressure controller and overhead condenser, receiver and off-gas dry ice trap. 773 grams 1-hexadecene was also charged to the reactor, and the agitated mixture was heated to 150° C. and the reactor pressure controller was set for 755 mm Hg. Traces of moisture were removed by sparging 6.7 L/min nitrogen through the mixture for about an hour. After drying, the nitrogen was fed to the reactor head space at a rate of 0.5 L/min. 5,094 grams maleic anhydride and 308 grams of di-t-amyl peroxide were fed simultaneously to the reactor over 2 hours. After the maleic anhydride and di-t-amyl peroxide charging were finished, the temperature of the reactor was maintained at 150° C. for another 1.5 hours. At the end of the reaction period, a 234 gram sample was taken, and then reactor was heated to 165° C. During the heating of the reactor, the pressure was gradually lowered to 30 mm Hg when the temperature of the reactor reached about 160° C. The temperature was held at 165° C. and the pressure was held at 30 mm Hg for 1 hour during which no condensate was collected in the receiver. A dry ice trap downstream of the receiver collected 7 grams of condensate before the heat-up to 165° C. and another 99 grams at the end of the vacuum distillation. After breaking the vacuum with nitrogen and removing 326 grams of samples, the product was cooled and a yield of 75,850 grams of copolymer (i) was obtained. The product was discharged to a drum containing 46,500 grams of 100 Neutral oil to give an oil concentration of 38.0 wt % and a diluted product weight of 122,350 grams.

Example 25

Terpolymer Preparation

A previously dried mixture of 49,346 pounds of high methylvinylidene polyisobutylene having a number average molecular weight (Mn) of about 2300, a methylvinylidene content of about 78% (which is available from BASF as Glissopal® 2300) and 121 pounds of 1-hexadecene was charged to a 10,000-gallon reactor equipped with agitator, temperature controller, pressure controller and overhead condenser and receiver. An additional 537 pounds of 1-hexadecene was charged to the reactor, and the agitated mixture was heated to 150° C. and the pressure controller set to 14.6 psia. A nitrogen sweep to the reactor head space was used to control the pressure. 3,515 pounds of maleic anhydride and 233 pounds of di-t-amyl peroxide were fed simultaneously to the reactor over 2 hours. After the maleic anhydride and di-t-amyl peroxide charging were finished, the temperature of the reactor was maintained at 150° C. for another 1.5 hours. The reactor was heated to 165° C. and the pressure was gradually lowered to 30 mm Hg. The temperature was held at 165° C. and the pressure was held at 30 mm Hg for 1 hour. After breaking the vacuum with nitrogen, the product was cooled and 3,151 lbs of Terpolymer was removed from the reactor and most of this sample was stored in drums. The remaining product was transferred to a storage tank. The total estimated yield of Terpolymer was 53,597 pounds.

Example 26

Synthesis of Polysuccinimide from Terpolymer Containing 52.8% Oil 2025.1 grams of Terpolymer from Example 24 and 634.1 grams of 100 Neutral oil were charged to a 4-L reactor equipped with agitator, temperature controller, pressure controller and overhead condenser, receiver and off-gas dry ice trap. Since the Terpolymer already contained 38 wt % oil, the separate oil charge to the reactor increased the oil concentration in the Terpolymer to a total of 52.8 wt %. The agitated mixture was heated to 85-95° C. and the reactor head space was purged with 150 scm$^3$/min of nitrogen. 55.4 grams of N-phenylphenylenediamine and 288.8 grams of a polyethyleneoxide diamine (having an approximate number average molecular weight of 913) were charged to the reactor. The charges corresponded to 0.34 moles of N-phenylphenylenediamine per mole of anhydride in the Terpolymer and 0.33 moles of polyethyleneoxide diamine per mole of anhydride in the Terpolymer. The reactor pressure controller was set at 750 mm Hg with a head space purge of 150 scm$^3$/min of nitrogen. The reactor was heated to 165° C. over 2 hours and held at a final temperature of 165° C. for 1.5 hours. The pressure was gradually lowered to 100 mm Hg and the reactor was held at 165° C. and 100 mm Hg for 30 minutes to remove any traces of water. The reactor was cooled and weighed to give a polysuccinimide yield of 2985.8 grams.

Following the general procedure of Example 26, Examples 27-36 were carried out and are summarized in Table 7. In some cases, additional diluent oil was added at the end during cool down so that the product samples were compared on the same concentration basis. In Examples 30-33, the vacuum distillation period to remove traces of water was omitted.

Table 8 lists the kinematic viscosity (at 100° C.) of the product samples of Examples 26-36, while FIG. 1 illustrates the change in viscosity for different concentrations of base oil in the starting Terpolymer. Unexpectedly, and as is clear from FIG. 1, the dilution of the Terpolymer before the imidation reaction affects the outcome of the reaction. The use of less oil in the Terpolymer results in higher normalized product viscosity and the use of more oil results in lower normalized product viscosity. The higher normalized product viscosity is preferred.

TABLE 7

Terpolymer reacted with NPPDA and polyethyleneoxide diamine

| | | Reaction Charges | | | | | |
|---|---|---|---|---|---|---|---|
| Example | Terpolymer Preparation | Terpolymer (g) | Additional Diluent Oil (g) | NPPDA (g) | PEO DA (g) | NPPDA to Anhydride CMR | PEO DA to Anhydride CMR | Vacuum Distillation |
| 26 | Example 24 | 2025.1 | 634.1 | 55.4 | 288.8 | 0.34 | 0.33 | Yes |
| 27 | Example 25 | 1286.6 | 1380.0 | 53.4 | 283.5 | 0.33 | 0.33 | Yes |
| 28 | Example 24 | 2350.0 | 285.4 | 63.2 | 335.1 | 0.33 | 0.33 | Yes |
| 29 | Example 25 | 1488.1 | 1147.0 | 62.1 | 327.9 | 0.33 | 0.33 | Yes |
| 30 | Example 25 | 1488.2 | 801.2 | 61.8 | 328.2 | 0.33 | 0.33 | No |
| 31 | Example 25 | 1488.0 | 1146.9 | 61.8 | 327.9 | 0.33 | 0.33 | No |
| 32 | Example 25 | 1488.2 | 912.0 | 61.8 | 333.1 | 0.33 | 0.34 | No |
| 33 | Example 25 | 1488.2 | 912.0 | 62.3 | 328.1 | 0.34 | 0.33 | No |
| 34 | Example 25 | 1488.2 | 912.0 | 61.8 | 327.9 | 0.33 | 0.33 | Yes |
| 35 | Example 25 | 1488.1 | 801.2 | 61.8 | 327.9 | 0.33 | 0.33 | Yes |
| 36 | Example 25 | 1488.0 | 912.0 | 61.9 | 327.9 | 0.33 | 0.33 | Yes |

NPPDA: N-phenylphenylenediamine
PEO DA: Polyethyleneoxide diamine

TABLE 8

Effect of diluent oil in the starting reaction mixture on the product viscosity (normalized to same oil content)

| Example | Terpolymer Preparation | Total Terpolymer Oil content (wt %) | Product Oil Content (wt %) | Product Viscosity at 46.2-47 wt % Oil Content (cSt at 100° C.) |
|---|---|---|---|---|
| 26 | Example 24 | 52.8 | 47.0 | 422.8 |
| 27 | Example 25 | 51.8 | 46.2 | 437.9 |
| 28 | Example 24 | 44.7 | 47.0 | 499.5 |
| 29 | Example 25 | 43.5 | 46.2 | 528.0 |
| 30 | Example 25 | 35.0 | 46.2 | 549.8 |
| 31 | Example 25 | 43.5 | 46.2 | 513.9 |
| 32 | Example 25 | 38.0 | 46.2 | 551.9 |
| 33 | Example 25 | 38.0 | 46.2 | 557.1 |
| 34 | Example 25 | 38.0 | 46.2 | 537.4 |
| 35 | Example 25 | 35.0 | 46.2 | 562.8 |
| 36 | Example 25 | 38.0 | 46.2 | 529.6 |

It is understood that although modifications and variations of the invention can be made without departing from the spirit and scope thereof, only such limitations should be imposed as are indicated in the appended claims.

What is claimed is:

1. An oil-soluble lubricating oil additive composition prepared by the process which comprises reacting (A) at least one of the following copolymers:
(i) a copolymer obtained by free radical copolymerization of components comprising:
(a) at least one monoethylenically unsaturated $C_3$-$C_{28}$ monocarboxylic acid or ester thereof, or $C_4$-$C_{28}$ dicarboxylic acid, anhydride or ester thereof;
(b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
(c) at least one monoolefin compound which is copolymerizable with the monomers of (a) and (b) and is selected from the group consisting of:

(1) an alkyl vinyl ether and an allyl alkyl ether where the alkyl group is hydroxyl, amino, dialkylamino or alkoxy substituted or is unsubstituted, and containing from about 1 to about 40 carbon atoms;

(2) an alkyl amine and an N-alkylamide of a monoethylenically unsaturated mono- or dicarboxylic acid of from about 3 to about 10 carbon atoms where the alkyl substituent contains from about 1 to about 40 carbon atoms;

(3) an N-vinylcarboxamide of carboxylic acids of from about 1 to about 8 carbon atoms;

(4) an N-vinyl substituted nitrogen-containing heterocyclic compound; and (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);

(ii) a copolymer obtained by reacting compound (i)(a) and compound (i)(b) in the presence of a free radical initiator; or (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
(B) at least one ether compound selected from the group consisting of an ether polyamine, a polyether polyamine, a polyether amino alcohol, a polyether amino thiol, and a polyether polyol; and
(C) at least one aromatic amine,
wherein in step (A) said copolymer (i), said copolymer (ii) or said copolymer (iii) is admixed with diluent oil, thereby producing a diluted copolymer.

2. The lubricating oil additive composition of claim 1, wherein in copolymer (iii)(b), said copolymer (i) or copolymer (ii) or both are contacted with the non-free radical catalyzed reaction product of compound (i)(a) and compound (i)(b) or (i)(c) in the presence of component (C).

3. The lubricating oil additive composition of claim 1, wherein the total amount of oil in the diluted copolymer is up to about 80 wt %.

4. The lubricating oil additive composition of claim 3, wherein the total amount of oil in the diluted copolymer is from about 20 wt % to about 60 wt %.

5. The lubricating oil additive composition of claim 4, wherein the total amount of oil in the diluted copolymer is from about 30 wt % to about 50 wt %.

6. The lubricating oil additive composition of claim 1, wherein the ether compound (B) is a polyether polyamine.

7. The lubricating oil additive composition of claim 1, wherein the polyether polyamine is a polyoxyalkylene diamine wherein each alkylene unit individually contains from about 2 to about 5 carbon atoms.

8. The lubricating oil additive composition of claim 7 wherein the oxyalkylene moiety is oxyethylene or oxypropylene, or mixtures thereof.

9. The lubricating oil additive composition of claim 8 wherein the polyether polyamine is polyoxyethylene diamine.

10. The lubricating oil additive composition of claim 1 wherein the copolymer is copolymer (i).

11. The lubricating oil additive composition of claim 1 wherein the copolymer is copolymer (ii).

12. The lubricating oil additive composition of claim 11 wherein copolymer (ii) is polyPIBSA, obtained by the free radical catalyzed reaction of maleic anhydride and polyisobutylene.

13. The lubricating oil additive composition of claim 1 wherein the copolymer is copolymer (iii).

14. The lubricating oil additive composition of claim 1 wherein the aromatic amine is selected from a group consisting of N-arylphenylenediamine, aminocarbazole, amino-indazolinone, aminomercaptotriazole, aminoperimidine, and aryloxyphenyleneamine.

15. The lubricating oil additive composition of claim 14 wherein the aromatic amine is N-arylphenylenediamine.

16. The lubricating oil additive composition of claim 15 wherein the N-arylphenylenediamine is N-phenylphenylenediamine.

17. The lubricating oil additive composition of claim 1 wherein compound (i)(b) of copolymer (i) is polyisobutene having a number average molecular weight ($M_n$) of about 2300.

18. The lubricating oil additive composition of claim 1 wherein (i)(a) is a dicarboxylic acid, anhydride or ester thereof.

19. The lubricating oil additive composition of claim 18 wherein (i)(a) is maleic anhydride or ester thereof.

20. The lubricating oil additive composition of claim 1 wherein the monoolefin of (i)(c) is a 1-olefin.

21. A lubricating oil composition comprising a major amount of an oil of lubricating viscosity and a minor amount of the lubricating oil additive composition prepared by the process which comprises reacting
(A) at least one of the following copolymers:
  (i) a copolymer obtained by free radical copolymerization of components comprising:
    (a) at least one monoethylenically unsaturated $C_3$-$C_{28}$ monocarboxylic acid or ester thereof, or a $C_4$-$C_{28}$ dicarboxylic acid, anhydride or ester thereof;
    (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
    (c) at least one monoolefin compound which is copolymerizable with the monomers of (a) and (b) and is selected from the group consisting of:
      (1) an alkyl vinyl ether and an allyl alkyl ether where the alkyl group is hydroxyl, amino, dialkylamino or alkoxy substituted or is unsubstituted, and containing from about 1 to about 40 carbon atoms;
      (2) an alkyl amine and an N-alkylamide of a monoethylenically unsaturated mono- or dicarboxylic acid of from about 3 to about 10 carbon atoms where the alkyl substituent contains 1 to 40 carbon atoms;
      (3) an N-vinylcarboxamide of carboxylic acids of from about 1 to about 8 carbon atoms;
      (4) an N-vinyl substituted nitrogen-containing heterocyclic compound; and
      (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
  (ii) a copolymer obtained by reacting compound (i)(a) and compound(i)(b) in the presence of a free radical initiator; or
  (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
(B) at least one ether compound selected from the group consisting of an ether polyamine, a polyether polyamine, a polyether amino alcohol, a polyether amino thiol, and a polyether polyol; and
(C) at least one aromatic amine,
wherein in step (A) said copolymer (i), said copolymer (ii) or said copolymer (iii) is admixed with diluent oil, thereby producing a diluted copolymer.

22. The lubricating oil additive composition of claim 21, wherein in copolymer (iii)(b), said copolymer (i) or copolymer (ii) or both are contacted with the non-free radical catalyzed reaction product of compound (i)(a) and compound (i)(b) or (i)(c) in the presence of component (C).

23. The lubricating oil additive composition of claim 21, wherein the total amount of oil in the diluted copolymer is up to about 80 wt %.

24. The lubricating oil additive composition of claim 23, wherein the total amount of oil in the diluted copolymer is from about 20 wt % to about 60 wt %.

25. The lubricating oil additive composition of claim 24, wherein the total amount of oil in the diluted copolymer is from about 30 wt % to about 50 wt %.

26. The lubricating oil composition of claim 21, wherein the ether compound (B) is a polyether polyamine.

27. The lubricating oil composition of claim 26, wherein the polyether polyamine is a polyoxyalkylene diamine wherein each alkylene unit individually contains from about 2 to 5 carbon atoms.

28. The lubricating oil composition of claim 27 wherein the oxyalkylene moiety is oxyethylene or oxypropylene, or mixtures thereof.

29. The lubricating oil composition of claim 28 wherein the polyether polyamine is polyoxyethylene diamine.

30. The lubricating oil composition of claim 21 wherein the copolymer is copolymer (i).

31. The lubricating oil composition of claim 21 wherein the copolymer is copolymer (ii).

32. The lubricating oil composition of claim 31 wherein copolymer (ii) is polyPIBSA, obtained by the free radical catalyzed reaction of maleic anhydride and polyisobutylene.

33. The lubricating oil composition of claim 21 wherein the copolymer is copolymer (iii).

34. The lubricating oil composition of claim 21 wherein the aromatic amine is selected from a group consisting of N-arylphenylenediamine, aminocarbazole, amino-indazolinone, aminomercaptotriazole, aminoperimidine, and aryloxyphenyleneamine.

35. The lubricating oil composition of claim 34 wherein the aromatic amine is N-arylphenylenediamine.

36. The lubricating oil composition of claim 35 wherein the N-arylphenylenediamine is N-phenylphenylenediamine.

37. The lubricating oil composition of claim 21 wherein compound (i)(b) of copolymer (i) is polyisobutene having a number average molecular weight ($M_n$) of about 2300.

38. The lubricating oil composition of claim 37 wherein (i)(a) is a dicarboxylic acid, anhydride or ester thereof.

39. The lubricating oil composition of claim 21 wherein (i)(a) is maleic anhydride or ester thereof.

40. The lubricating oil composition of claim 21 wherein the monoolefin of (i)(c) is a 1-olefin.

41. A method of making a lubricating oil additive composition which comprises reacting
(A) at least one of the following copolymers:
(i) a copolymer obtained by free radical copolymerization of components comprising:
(a) at least one monoethylenically unsaturated $C_3$-$C_{28}$ monocarboxylic acid or ester thereof, or a $C_4$-$C_{28}$ dicarboxylic acid, anhydride or ester thereof;
(b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
(c) at least one monoolefin compound which is copolymerizable with the monomers of (a) and (b) and is selected from the group consisting of:
(1) an alkyl vinyl ether and an allyl alkyl ether where the alkyl group is hydroxyl, amino, dialkylamino or alkoxy substituted or is unsubstituted, and containing from about 1 to about 40 carbon atoms;
(2) an alkyl amine and an N-alkylamide of a monoethylenically unsaturated mono- or dicarboxylic acid of from about 3 to about 10 carbon atoms where the alkyl substituent contains from about 1 to about 40 carbon atoms;
(3) an N-vinylcarboxamide of carboxylic acids of from about 1 to about 8 carbon atoms;
(4) an N-vinyl substituted nitrogen-containing heterocyclic compound; and
(5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
(iii) a copolymer obtained by reacting compound (i)(a) and compound(i)(b) in the presence of a free radical initiator; or
(iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
(B) at least one ether compound selected from the group consisting of an ether polyamine, a polyether polyamine, a polyether amino alcohol, a polyether amino thiol, and a polyether polyol; and
(C) at least one aromatic amine,
wherein in step (A) said copolymer (i), said copolymer (ii) or said copolymer (iii) is admixed with diluent oil, thereby producing a diluted copolymer.

42. The lubricating oil additive composition of claim 41, wherein in copolymer (iii)(b), said copolymer (i) or copolymer (ii) or both are contacted with the non-free radical catalyzed reaction product of compound (i)(a) and compound (i)(b) or (i)(c) in the presence of component (C).

43. The lubricating oil additive composition of claim 41, wherein the total amount of oil in the diluted copolymer is up to about 80 wt %.

44. The lubricating oil additive composition of claim 43, wherein the total amount of oil in the diluted copolymer is from about 20 wt % to about 60 wt %.

45. The lubricating oil additive composition of claim 44, wherein the total amount of oil in the diluted copolymer is from about 30 wt % to about 50 wt %.

46. A method of improving soot dispersancy in an internal combustion engine which comprises operating the engine with the lubricating oil composition comprising a major amount of oil of lubricating viscosity and an effective amount of the lubricating oil additive composition of claim 1.

* * * * *